US010523401B2

(12) United States Patent
Wu et al.

(10) Patent No.: US 10,523,401 B2
(45) Date of Patent: Dec. 31, 2019

(54) METHOD, APPARATUS, AND SYSTEM FOR HANDLING CO-CHANNEL CELL INTERFERENCE

(71) Applicant: Huawei Technologies Co., Ltd., Shenzhen (CN)

(72) Inventors: Zuomin Wu, Beijing (CN); Hai Wu, Beijing (CN); Xingqing Cheng, Beijing (CN); Ningbo Zhang, Shenzhen (CN); Hao Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 15/009,963

(22) Filed: Jan. 29, 2016

(65) Prior Publication Data
US 2016/0150548 A1 May 26, 2016

Related U.S. Application Data

(63) Continuation of application No. PCT/CN2013/080446, filed on Jul. 30, 2013.

(51) Int. Cl.
*H04L 5/00* (2006.01)
*H04J 11/00* (2006.01)
(Continued)

(52) U.S. Cl.
CPC .......... *H04L 5/0073* (2013.01); *H04J 11/005* (2013.01); *H04L 5/0035* (2013.01);
(Continued)

(58) Field of Classification Search
CPC .. H04L 5/0073; H04L 5/0035; H04W 72/042; H04W 72/082; H04J 11/005
See application file for complete search history.

(56) References Cited

U.S. PATENT DOCUMENTS 9,509,425 B2\* 11/2016 Kim ..................... H04J 11/0056
2009/0286482 A1 11/2009 Gorokhov et al.
(Continued)

FOREIGN PATENT DOCUMENTS

CN 102598792 A 7/2012
CN 103155442 A 6/2013
(Continued)

OTHER PUBLICATIONS

"3rd Generation Partnership Project; Technical Specification Group Radio Access Network; Evolved Universal Terrestrial Radio Access (E-UTRA); Physical Layer Procedures (Release 11)," 3GPP TS 36.213, V11.3.0, Jun. 2013, 176 pages.
(Continued)

*Primary Examiner* — Omer S Mian
(74) *Attorney, Agent, or Firm* — Slater Matsil, LLP

(57) ABSTRACT

Embodiments provide a method, an apparatus, and a system for handling co-channel cell interference, a base station and a user terminal. The method includes obtaining interference information of a non-serving cell; and sending the obtained interference information of the non-serving cell to a user terminal UE. Co-channel interference caused in the non-serving cell to the UE can be well suppressed or cancelled, and performance of the UE in demodulating a PDSCH can be better improved.

2 Claims, 5 Drawing Sheets

(51) Int. Cl.
*H04W 24/02* (2009.01)
*H04W 72/04* (2009.01)
*H04W 72/08* (2009.01)

(52) U.S. Cl.
CPC ......... *H04W 24/02* (2013.01); *H04W 72/042* (2013.01); *H04W 72/082* (2013.01); *H04L 5/0023* (2013.01); *H04L 5/0051* (2013.01); *H04L 5/0091* (2013.01)

(56) References Cited

U.S. PATENT DOCUMENTS

| | | | |
|---|---|---|---|
| 2011/0110251 | A1 | 5/2011 | Krishnamurthy et al. |
| 2013/0148538 | A1 | 6/2013 | Ohwatari et al. |
| 2014/0241200 | A1 | 8/2014 | Chun et al. |
| 2015/0029995 | A1 | 1/2015 | Krishnamurthy et al. |
| 2015/0139151 | A1* | 5/2015 | Seo .................. H04J 13/18 370/329 |
| 2015/0223220 | A1* | 8/2015 | Zhao ................. H04W 24/02 455/450 |
| 2016/0021565 | A1* | 1/2016 | Kim .................. H04L 5/005 370/329 |
| 2016/0021642 | A1* | 1/2016 | Kim .................. H04L 5/0039 370/329 |
| 2016/0135194 | A1* | 5/2016 | Kim .................. H04B 7/022 370/329 |

FOREIGN PATENT DOCUMENTS

| | | |
|---|---|---|
| JP | 2012231218 A | 11/2012 |
| JP | 2014524718 A | 9/2014 |
| WO | 2012094635 A1 | 7/2012 |
| WO | 2012138273 A1 | 10/2012 |
| WO | 2013029000 A1 | 2/2013 |
| WO | 2013055100 A1 | 4/2013 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331, V11.4.0, Jun. 2013, 346 pages.

"3rd Generation Partnership Project; Technical Specification Group Radio Access Network; Evolved Universal Terrestrial Radio Access (E-UTRA); Physical Channels and Modulation (Release 11)," 3GPP TS 36.211, V11.3.0, Jun. 2013, 108 pages.

Texas Instruments: "Support for Cell Detection and Rate-Matching for Co-Channel Het-Nets in Rel-11," TSG RAN WG1 Meeting #68, R1-120465, Feb. 6-10, 2012, 6 pages, Dresden, Germany.

Samsung: "Views on Signalling Requirements for CRS Interference Handling," 3GPP TSG-RAN2#77Bis Meeting, Tdoc R2-121495, Mar. 26-30, 2012, 4 pages, Jeju, Korea.

3rd Generation Partnership Project; Technical Specification Group Radio Access Network; Evolved Universal Terrestrial Radio Access (E-UTRA) and Evolved Universal Terrestrial Radio Access Network (EUTRAN); Overall Description; Stage 2 (Release 11), 3GPP TS 36.300, V11.6.0, Jun. 2013, 209 pages.

ZTE, "Consideration on Channels of Interest for NAICS," 3GPP TSG RAN WG1 Meeting #73, R1-132097, Fukuoka, Japan, May 20-24, 2013, 5 pages.

ZTE, "Remaining Details on Scenarios and Simulation Assumption for NAICS," 3GPP TSG RAN WG1 Meeting #73, Fukuoka, Japan, May 20-24, 2013, 3 pages.

* cited by examiner

METHOD, APPARATUS, AND SYSTEM FOR HANDLING CO-CHANNEL CELL INTERFERENCE

This application is a continuation of International Application No. PCT/CN2013/080446, filed on Jul. 30, 2013, which is hereby incorporated by reference in its entirety.

TECHNICAL FIELD

The present invention relates to the field of wireless communications technologies, and in particular, to a method, an apparatus, and a system for handling co-channel cell interference, a base station and a user terminal.

BACKGROUND

As an evolved system of the 3rd generation (3G) communications system, a Long Term Evolution (LTE) communications system improves and enhances the over-the-air access technology in 3G, and uses an orthogonal frequency division multiplexing (OFDM) technology and a multiple-input multiple-output (MIMO) technology as a unique standard for wireless network evolution of the LTE communications system. A main performance target of the LTE project in the 3rd Generation Partnership Project (3GPP) includes a capability of providing a downlink peak rate of 100 Mbps and an uplink peak rate of 50 Mbps with a spectrum bandwidth of 20 MHz, improving performance of a cell-edge user terminal (UE), increasing the capacity of a base station, reducing a system delay, and the like.

In a downlink transmission link of the LTE communications system, a main procedure of receiving, by the UE, data sent from a serving cell is as follows.

Step 1: The UE listens on and demodulates a downlink control channel, and obtains downlink control information (DCI) transmitted over the downlink control channel of the serving cell.

The downlink control channel may include a physical downlink control channel (PDCCH) or an enhanced physical downlink control channel (EPDCCH). The serving cell refers to a cell that is currently serving the UE; likewise, a base station that is currently serving the UE may be referred to as a serving base station. An intra-frequency cell of the serving cell that is not currently serving the UE may be referred to as a non-serving cell of the UE.

Step 2: According to the obtained DCI, the UE listens on and demodulates a physical downlink shared channel (PDSCH) to obtain data transmitted over the PDSCH.

The DCI that is transmitted over the downlink control channel and correctly received by the UE includes necessary information for instructing the UE to demodulate the PDSCH. For example, the DCI includes a resource assignment position, pilot information, and the like. When demodulating the PDSCH, the UE generally performs channel estimation on the serving cell according to the pilot information, and then completes demodulation of the PDSCH.

When demodulating the PDSCH, if the UE is not subject to co-channel interference, the UE does not need to perform interference suppression or interference cancellation processing. For example, the UE may obtain relatively good demodulation performance by using only a minimum mean square error (MMSE) algorithm. However, generally, the UE may be subject to co-channel interference caused by the non-serving cell or a paired UE in the serving cell, and the interference deteriorates the performance of the UE in demodulating the PDSCH.

In conclusion, generally, when demodulating a PDSCH, a UE may be subject to co-channel interference caused by a non-serving cell; therefore, performance of the UE in demodulating the PDSCH is relatively poor.

SUMMARY

The present invention provides a method, an apparatus, and a system for handling co-channel cell interference, a base station and a user terminal, which can well suppress or cancel co-channel interference caused by a non-serving cell to a UE, and better improve performance of the UE in demodulating a PDSCH.

According to a first aspect, a method for handling co-channel cell interference is provided. The method includes obtaining interference information of a non-serving cell, where the interference information includes a generation parameter, and the generation parameter is a parameter value used to determine an initialization parameter of a user-terminal-specific reference signal sequence of the non-serving cell, and sending the obtained interference information of the non-serving cell to a user terminal UE.

In a first possible implementation manner of the first aspect, the generation parameter is a physical cell identifier or a virtual cell identifier of the non-serving cell.

In a second possible implementation manner of the first aspect, the interference information further includes at least one type of the following information: information about a physical resource block PRB in which a transmission mode based on a user-terminal-specific reference signal sequence demodulation channel is used in the non-serving cell; information about an antenna port used in the non-serving cell to send the user-terminal-specific reference signal sequence; physical resource block bundling PRB bundling information of the non-serving cell; and pilot data power ratio information of the non-serving cell.

With reference to the second possible implementation manner of the first aspect, in a third possible implementation manner of the first aspect, the PRB bundling information of the non-serving cell includes at least one of the following: information about whether PRB bundling can be used in the non-serving cell; information that PRB bundling can be used on a specific time domain resource of the non-serving cell within a set time period; and information that PRB bundling can be used on a time-frequency resource of the non-serving cell.

With reference to the second possible implementation manner of the first aspect, in a fourth possible implementation manner of the first aspect, sending the obtained PRB bundling information of the non-serving cell to the UE includes: sending configuration information of an enhanced physical downlink control channel EPDCCH of the non-serving cell to the UE, where the configuration information of the EPDCCH is information used by the UE to learn, according to the configuration information of the EPDCCH, whether PRB bundling can be used in the non-serving cell.

According to a second aspect, a method for handling co-channel cell interference is provided, including: receiving interference information of a non-serving cell, where the interference information includes a generation parameter, and the generation parameter is a parameter value used to determine an initialization parameter of a user-terminal-specific reference signal sequence of the non-serving cell; and handling, according to the received interference information, co-channel interference brought by a downlink transmission signal of the non-serving cell to a downlink transmission signal of a serving cell.

In a first possible implementation manner of the second aspect, the handling, according to the received interference information, co-channel interference brought by a downlink transmission signal of the non-serving cell to a downlink transmission signal of a serving cell includes: determining the user-terminal-specific reference signal sequence of the non-serving cell according to the received generation parameter; performing channel estimation on a downlink transmission channel of the non-serving cell according to the determined user-terminal-specific reference signal sequence; and handling, according to an obtained channel estimation value and pilot data power ratio information of the non-serving cell, the co-channel interference brought by the downlink transmission signal of the non-serving cell to the downlink transmission signal of the serving cell.

With reference to the first possible implementation manner of the second aspect, in a second possible implementation manner of the second aspect, the performing channel estimation on a downlink transmission channel of the non-serving cell according to the determined user-terminal-specific reference signal sequence includes: obtaining a demodulation pilot sequence in a position of a currently scheduled time-frequency resource of the serving cell and based on physical resource block bundling PRB bundling information, information about a PRB in which a transmission mode based on a user-terminal-specific reference signal sequence demodulation channel is used in the non-serving cell, and information about an antenna port used in the non-serving cell to send the determined user-terminal-specific reference signal sequence, where the demodulation pilot sequence is on the antenna port corresponding to the antenna port information and is used to demodulate a reference signal transmitted over the downlink transmission channel; and performing channel estimation on the downlink transmission channel of the non-serving cell according to the obtained demodulation pilot sequence and based on the PRB bundling information.

With reference to the second possible implementation manner of the second aspect, in a third possible implementation manner of the second aspect, the PRB bundling information is bundling of a preset fixed quantity of PRBs; or the PRB bundling information is obtained from the received interference information.

With reference to the second possible implementation manner of the second aspect, in a fourth possible implementation manner of the second aspect, the information about the PRB in which the transmission mode based on the user-terminal-specific reference signal sequence demodulation channel is used in the non-serving cell is obtained from the received interference information; or the information about the PRB in which the transmission mode based on the user-terminal-specific reference signal sequence demodulation channel is used in the non-serving cell is obtained by performing blind detection on a physical resource block PRB of the non-serving cell based on the PRB bundling information.

With reference to the second possible implementation manner of the second aspect, in a fifth possible implementation manner of the second aspect, the information about the antenna port used in the non-serving cell to send the user-terminal-specific reference signal sequence is obtained from the received interference information; or the information about the antenna port used in the non-serving cell to send the user-terminal-specific reference signal sequence is obtained by performing blind detection on a PRB of the non-serving cell based on the PRB bundling information.

With reference to any one of the second possible implementation manner of the second aspect to the fifth possible implementation manner of the second aspect, in a sixth possible implementation manner of the second aspect, the PRB bundling information of the non-serving cell includes at least one of the following: information about whether PRB bundling can be used in the non-serving cell; information that PRB bundling can be used on a specific time domain resource of the non-serving cell within a set time period; and information that PRB bundling can be used on a time-frequency resource of the non-serving cell.

With reference to any one of the second possible implementation manner of the second aspect to the fifth possible implementation manner of the second aspect, in a seventh possible implementation manner of the second aspect, the PRB bundling information of the non-serving cell is obtained according to configuration information of an enhanced physical downlink control channel EPDCCH of the non-serving cell.

With reference to the first possible implementation manner of the second aspect, in an eighth possible implementation manner of the second aspect, the pilot data power ratio information of the non-serving cell is obtained from the received interference information; or the pilot data power ratio information of the non-serving cell is a preset fixed value.

According to a third aspect, an apparatus for handling co-channel cell interference is provided. The apparatus includes an obtaining module, configured to: obtain interference information of a non-serving cell, and transmit the obtained interference information to a sending module, where the interference information includes a generation parameter, and the generation parameter is a parameter value used to determine an initialization parameter of a user-terminal-specific reference signal sequence of the non-serving cell; and the sending module, configured to: receive the interference information transmitted by the obtaining module, and send the obtained interference information of the non-serving cell to a user terminal UE.

In a first possible implementation manner of the third aspect, the generation parameter obtained by the obtaining module is a physical cell identifier or a virtual cell identifier of the non-serving cell.

In a second possible implementation manner of the third aspect, the interference information obtained by the obtaining module further includes at least one type of the following information: information about a physical resource block PRB in which a transmission mode based on a user-terminal-specific reference signal sequence demodulation channel is used in the non-serving cell; information about an antenna port used in the non-serving cell to send the user-terminal-specific reference signal sequence; physical resource block bundling PRB bundling information of the non-serving cell; and pilot data power ratio information of the non-serving cell.

With reference to the second possible implementation manner of the third aspect, in a third possible implementation manner of the third aspect, the PRB bundling information of the non-serving cell obtained by the obtaining module includes at least one of the following: information about whether PRB bundling can be used in the non-serving cell; information that PRB bundling can be used on a specific time domain resource of the non-serving cell within a set time period; and information that PRB bundling can be used on a time-frequency resource of the non-serving cell.

With reference to the second possible implementation manner of the third aspect, in a fourth possible implementation manner of the third aspect, the sending module is specifically configured to send configuration information of an enhanced physical downlink control channel EPDCCH of the non-serving cell to the UE, where the configuration information of the EPDCCH is information used by the UE to learn, according to the configuration information of the EPDCCH, whether PRB bundling can be used in the non-serving cell.

According to a fourth aspect, an apparatus for handling co-channel cell interference is provided, including: a receiving module, configured to: receive interference information of a non-serving cell, and transmit the received interference information to a processing module, where the interference information includes a generation parameter, and the generation parameter is a parameter value used to determine an initialization parameter of a user-terminal-specific reference signal sequence of the non-serving cell; and the processing module, configured to handle, according to the received interference information transmitted by the receiving module, co-channel interference brought by a downlink transmission signal of the non-serving cell to a downlink transmission signal of a serving cell.

In a first possible implementation manner of the fourth aspect, the processing module is specifically configured to: determine the user-terminal-specific reference signal sequence of the non-serving cell according to the received generation parameter, perform channel estimation on a downlink transmission channel of the non-serving cell according to the determined user-terminal-specific reference signal sequence, and handle, according to an obtained channel estimation value and pilot data power ratio information of the non-serving cell, the co-channel interference brought by the downlink transmission signal of the non-serving cell to the downlink transmission signal of the serving cell.

With reference to the first possible implementation manner of the fourth aspect, in a second possible implementation manner of the fourth aspect, the processing module is specifically configured to: obtain a demodulation pilot sequence in a position of a currently scheduled time-frequency resource of the serving cell and based on physical resource block bundling PRB bundling information, information about a PRB in which a transmission mode based on a user-terminal-specific reference signal sequence demodulation channel is used in the non-serving cell, and information about an antenna port used in the non-serving cell to send the determined user-terminal-specific reference signal sequence, where the demodulation pilot sequence is on the antenna port corresponding to the antenna port information and is used to demodulate a reference signal transmitted over the downlink transmission channel; and perform channel estimation on the downlink transmission channel of the non-serving cell according to the obtained demodulation pilot sequence and based on the PRB bundling information.

With reference to the second possible implementation manner of the fourth aspect, in a third possible implementation manner of the fourth aspect, the PRB bundling information obtained by the processing module is bundling of a preset fixed quantity of PRBs; or the PRB bundling information is obtained from the received interference information.

With reference to the second possible implementation manner of the fourth aspect, in a fourth possible implementation manner of the fourth aspect, the information, obtained by the processing module, about the PRB in which the transmission mode based on the user-terminal-specific reference signal sequence demodulation channel is used in the non-serving cell is obtained from the received interference information; or the information about the PRB in which the transmission mode based on the user-terminal-specific reference signal sequence demodulation channel is used in the non-serving cell is obtained by performing blind detection on a physical resource block PRB of the non-serving cell based on the PRB bundling information.

With reference to the second possible implementation manner of the fourth aspect, in a fifth possible implementation manner of the fourth aspect, the information, obtained by the processing module, about the antenna port used in the non-serving cell to send the user-terminal-specific reference signal sequence is obtained from the received interference information; or the information about the antenna port used in the non-serving cell to send the user-terminal-specific reference signal sequence is obtained by performing blind detection on a PRB of the non-serving cell based on the PRB bundling information.

With reference to any one of the second possible implementation manner of the fourth aspect to the fifth possible implementation manner of the fourth aspect, in a sixth possible implementation manner of the fourth aspect, the PRB bundling information of the non-serving cell obtained by the processing module includes at least one of the following: information about whether PRB bundling can be used in the non-serving cell; information that PRB bundling can be used on a specific time domain resource of the non-serving cell within a set time period; and information that PRB bundling can be used on a time-frequency resource of the non-serving cell.

With reference to any one of the second possible implementation manner of the fourth aspect to the fifth possible implementation manner of the fourth aspect, in a seventh possible implementation manner of the fourth aspect, the PRB bundling information of the non-serving cell obtained by the processing module is obtained according to configuration information of an enhanced physical downlink control channel EPDCCH of the non-serving cell.

With reference to the first possible implementation manner of the fourth aspect, in an eighth possible implementation manner of the fourth aspect, the pilot data power ratio information of the non-serving cell obtained by the processing module is obtained from the received interference information; or the pilot data power ratio information of the non-serving cell is a preset fixed value.

According to a fifth aspect, a base station is provided, including: a signal processor, configured to: obtain interference information of a non-serving cell, and transmit the obtained interference information to a transceiver, where the interference information includes a generation parameter, and the generation parameter is a parameter value used to determine an initialization parameter of a user-terminal-specific reference signal sequence of the non-serving cell; and the transceiver, configured to: receive the interference information transmitted by the signal processor, and send the obtained interference information of the non-serving cell to a user terminal UE.

In a first possible implementation manner of the fifth aspect, the generation parameter obtained by the signal processor is a physical cell identifier or a virtual cell identifier of the non-serving cell.

In a second possible implementation manner of the fifth aspect, the interference information obtained by the signal processor further includes at least one type of the following information: information about a physical resource block PRB in which a transmission mode based on a user-terminalspecific reference signal sequence demodulation channel is used in the non-serving cell; information about an antenna port used in the non-serving cell to send the user-terminal-specific reference signal sequence; physical resource block bundling PRB bundling information of the non-serving cell; and pilot data power ratio information of the non-serving cell.

With reference to the second possible implementation manner of the fifth aspect, in a third possible implementation manner of the fifth aspect, the PRB bundling information of the non-serving cell obtained by the signal processor includes at least one of the following: information about whether PRB bundling can be used in the non-serving cell; information that PRB bundling can be used on a specific time domain resource of the non-serving cell within a set time period; and information that PRB bundling can be used on a time-frequency resource of the non-serving cell.

With reference to the second possible implementation manner of the fifth aspect, in a fourth possible implementation manner of the fifth aspect, the transceiver is specifically configured to send configuration information of an enhanced physical downlink control channel EPDCCH of the non-serving cell to the UE, where the configuration information of the EPDCCH is information used by the UE to learn, according to the configuration information of the EPDCCH, whether PRB bundling can be used in the non-serving cell.

According to a sixth aspect, a user terminal is provided. The user terminal includes a transceiver, configured to: receive interference information of a non-serving cell, and transmit the received interference information to a signal processor, where the interference information includes a generation parameter, and the generation parameter is a parameter value used to determine an initialization parameter of a user-terminal-specific reference signal sequence of the non-serving cell; and the signal processor, configured to handle, according to the received interference information transmitted by the transceiver, co-channel interference brought by a downlink transmission signal of the non-serving cell to a downlink transmission signal of a serving cell.

In a first possible implementation manner of the sixth aspect, the signal processor is specifically configured to: determine the user-terminal-specific reference signal sequence of the non-serving cell according to the received generation parameter, perform channel estimation on a downlink transmission channel of the non-serving cell according to the determined user-terminal-specific reference signal sequence, and handle, according to an obtained channel estimation value and pilot data power ratio information of the non-serving cell, the co-channel interference brought by the downlink transmission signal of the non-serving cell to the downlink transmission signal of the serving cell.

With reference to the first possible implementation manner of the sixth aspect, in a second possible implementation manner of the sixth aspect, the signal processor is specifically configured to: obtain a demodulation pilot sequence in a position of a currently scheduled time-frequency resource of the serving cell and based on physical resource block bundling PRB bundling information, information about a PRB in which a transmission mode based on a user-terminal-specific reference signal sequence demodulation channel is used in the non-serving cell, and information about an antenna port used in the non-serving cell to send the determined user-terminal-specific reference signal sequence, where the demodulation pilot sequence is on the antenna port corresponding to the antenna port information and is used to demodulate a reference signal transmitted over the downlink transmission channel; and perform channel estimation on the downlink transmission channel of the non-serving cell according to the obtained demodulation pilot sequence and based on the PRB bundling information.

With reference to the second possible implementation manner of the sixth aspect, in a third possible implementation manner of the sixth aspect, the PRB bundling information obtained by the signal processor is bundling of a preset fixed quantity of PRBs; or the PRB bundling information is obtained from the received interference information.

With reference to the second possible implementation manner of the sixth aspect, in a fourth possible implementation manner of the sixth aspect, the information, obtained by the signal processor, about the PRB in which the transmission mode based on the user-terminal-specific reference signal sequence demodulation channel is used in the non-serving cell is obtained from the received interference information; or the information about the PRB in which the transmission mode based on the user-terminal-specific reference signal sequence demodulation channel is used in the non-serving cell is obtained by performing blind detection on a physical resource block PRB of the non-serving cell based on the PRB bundling information.

With reference to the second possible implementation manner of the sixth aspect, in a fifth possible implementation manner of the sixth aspect, the information, obtained by the signal processor, about the antenna port used in the non-serving cell to send the user-terminal-specific reference signal sequence is obtained from the received interference information; or the information about the antenna port used in the non-serving cell to send the user-terminal-specific reference signal sequence is obtained by performing blind detection on a PRB of the non-serving cell based on the PRB bundling information.

With reference to any one of the second possible implementation manner of the sixth aspect to the fifth possible implementation manner of the sixth aspect, in a sixth possible implementation manner of the sixth aspect, the PRB bundling information of the non-serving cell obtained by the signal processor includes at least one of the following: information about whether PRB bundling can be used in the non-serving cell; information that PRB bundling can be used on a specific time domain resource of the non-serving cell within a set time period; and information that PRB bundling can be used on a time-frequency resource of the non-serving cell.

With reference to any one of the second possible implementation manner of the sixth aspect to the fifth possible implementation manner of the sixth aspect, in a seventh possible implementation manner of the sixth aspect, the PRB bundling information of the non-serving cell obtained by the signal processor is obtained according to configuration information of an enhanced physical downlink control channel EPDCCH of the non-serving cell.

With reference to the first possible implementation manner of the sixth aspect, in an eighth possible implementation manner of the sixth aspect, the pilot data power ratio information of the non-serving cell obtained by the signal processor is obtained from the received interference information; or the pilot data power ratio information of the non-serving cell is a preset fixed value.

According to a seventh aspect, a system for handling co-channel cell interference is provided. The system includes a base station and a user terminal, where the base station is configured to: obtain interference information of a non-serving cell, and transmit the obtained interference information of the non-serving cell to the UE, where the interference information includes a generation parameter, and the generation parameter is a parameter value used to determine an initialization parameter of a user-terminal-specific reference signal sequence of the non-serving cell; and the UE is configured to: receive the interference information of the non-serving cell, and handle, according to the received interference information, co-channel interference brought by a downlink transmission signal of the non-serving cell to a downlink transmission signal of a serving cell.

In a first possible implementation manner of the seventh aspect, the UE is specifically configured to: determine the user-terminal-specific reference signal sequence of the non-serving cell according to the received generation parameter, perform channel estimation on a downlink transmission channel of the non-serving cell according to the determined user-terminal-specific reference signal sequence, and handle, according to an obtained channel estimation value and pilot data power ratio information of the non-serving cell, the co-channel interference brought by the downlink transmission signal of the non-serving cell to the downlink transmission signal of the serving cell.

With reference to the first possible implementation manner of the seventh aspect, in a second possible implementation manner of the seventh aspect, the UE is specifically configured to: obtain a demodulation pilot sequence in a position of a currently scheduled time-frequency resource of the serving cell and based on physical resource block bundling PRB bundling information, information about a PRB in which a transmission mode based on a user-terminal-specific reference signal sequence demodulation channel is used in the non-serving cell, and information about an antenna port used in the non-serving cell to send the determined user-terminal-specific reference signal sequence, where the demodulation pilot sequence is on the antenna port corresponding to the antenna port information and is used to demodulate a reference signal transmitted over the downlink transmission channel; and perform channel estimation on the downlink transmission channel of the non-serving cell according to the obtained demodulation pilot sequence and based on the PRB bundling information.

With reference to the second possible implementation manner of the seventh aspect, in a third possible implementation manner of the seventh aspect, the PRB bundling information obtained by the UE is bundling of a preset fixed quantity of PRBs; or the PRB bundling information is obtained from the received interference information.

With reference to the second possible implementation manner of the seventh aspect, in a fourth possible implementation manner of the seventh aspect, the information, obtained by the UE, about the PRB in which the transmission mode based on the user-terminal-specific reference signal sequence demodulation channel is used in the non-serving cell is obtained from the received interference information; or the information about the PRB of the non-serving cell on which the transmission mode based on a user-terminal-specific reference signal sequence demodulation channel is used is obtained by performing blind detection on a physical resource block PRB of the non-serving cell based on the PRB bundling information.

With reference to the second possible implementation manner of the seventh aspect, in a fifth possible implementation manner of the seventh aspect, the information, obtained by the UE, about the antenna port used in the non-serving cell to send the user-terminal-specific reference signal sequence is obtained from the received interference information; or the information about the antenna port used in the non-serving cell to send the user-terminal-specific reference signal sequence is obtained by performing blind detection on a PRB of the non-serving cell based on the PRB bundling information.

With reference to any one of the second possible implementation manner of the seventh aspect to the fifth possible implementation manner of the seventh aspect, in a sixth possible implementation manner of the seventh aspect, the PRB bundling information of the non-serving cell obtained by the UE includes at least one of the following: information about whether PRB bundling can be used in the non-serving cell; information that PRB bundling can be used on a specific time domain resource of the non-serving cell within a set time period; and information that PRB bundling can be used on a time-frequency resource of the non-serving cell.

With reference to any one of the second possible implementation manner of the seventh aspect to the fifth possible implementation manner of the seventh aspect, in a seventh possible implementation manner of the seventh aspect, the PRB bundling information of the non-serving cell obtained by the UE is obtained according to configuration information of an enhanced physical downlink control channel EPDCCH of the non-serving cell.

With reference to the first possible implementation manner of the seventh aspect, in an eighth possible implementation manner of the seventh aspect, the pilot data power ratio information of the non-serving cell obtained by the UE is obtained from the received interference information; or the pilot data power ratio information of the non-serving cell is a preset fixed value.

By using the foregoing technical solutions, on a network device side, interference information of a non-serving cell is obtained, and the obtained interference information of the non-serving cell is sent to a UE, where the interference information includes a generation parameter; on a terminal side, the UE handles, according to the received interference information of the non-serving cell, co-channel interference brought by a downlink transmission signal of the non-serving cell to a downlink transmission signal of a serving cell. The network device sends the interference information of the non-serving cell to the UE, so that the UE can suppress or cancel, according to the received interference information of the non-serving cell, the co-channel interference brought by the non-serving cell to the downlink transmission signal of the serving cell, thereby improving performance of the UE in demodulating a downlink transmission channel.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
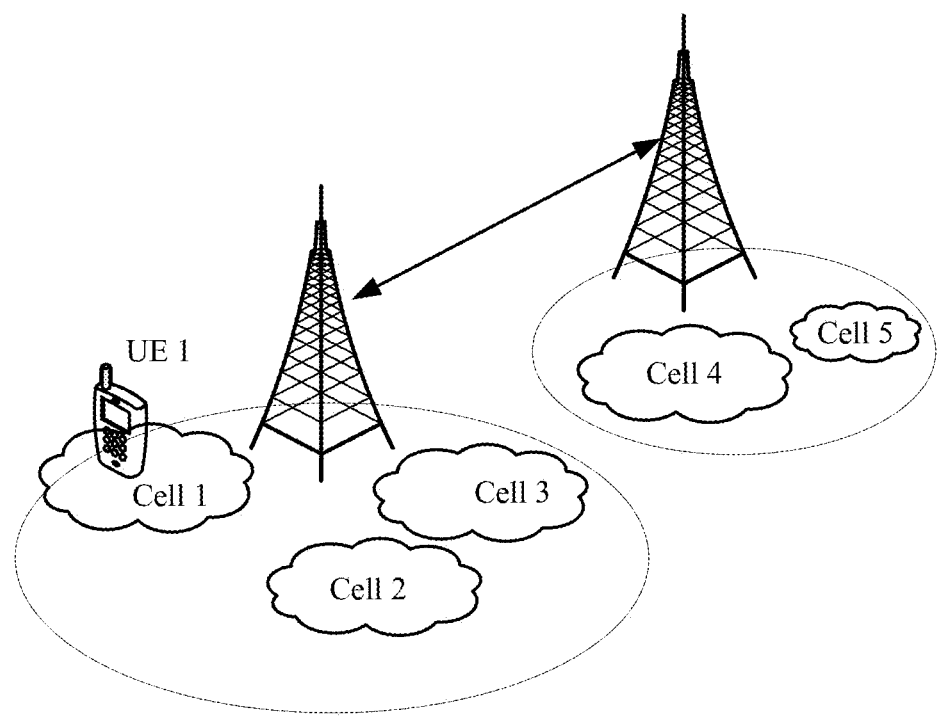
FIG. 1 is a schematic structural diagram of a system for handling co-channel cell interference according to Embodiment 1.

Generally, when a UE demodulates a PDSCH, the UE may receive co-channel interference caused by a non-serving cell to the UE, which results in a problem that performance of the UE in demodulating the PDSCH is relatively poor. In a technical solution proposed in embodiments, interference information of the non-serving cell is obtained, the obtained interference information of the non-serving cell is sent to the UE, and the UE handles, according to the received interference information of the non-serving cell, the co-channel interference brought by a downlink transmission signal of the non-serving cell to a downlink transmission signal of a serving cell. The interference information of the non-serving cell is sent to the UE, so that the UE can suppress or cancel, according to the received interference information of the non-serving cell, the co-channel interference brought by the non-serving cell to the downlink transmission signal of the serving cell, thereby improving performance of the UE in demodulating a downlink transmission channel.

The technology described in this specification may be applied to various communications systems, for example, current 2G and 3G communications systems and next-generation communications systems, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other communications systems.

Various aspects are described in this specification with respect to a user terminal and/or a base station and/or a base station controller.

The user terminal may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN for short). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol phone, a wireless local loop (WLL) station, or a personal digital assistant (PDA). The wireless terminal may also be referred to as a system, a subscriber unit, a subscriber station, a mobile station, a mobile terminal, a remote station (RS), an access point (AP), a remote terminal, an access terminal, a user terminal, a user agent, a user device, or user equipment.

The base station (for example, an access point) may refer to a device in communication with a wireless terminal via one or more sectors over the air interface in an access network. The base station may be configured to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base station (BTS) in GSM or CDMA, or may be a base station (NodeB) in WCDMA, or may be an evolved NodeB (NodeB or eNB, or e-NodeB) in LTE, which is not limited in the present invention.

The base station controller may be a base station controller (BSC) in GSM or CDMA, or a radio network controller (RNC) in WCDMA, which is not limited in the present invention.

In addition, the terms "system" and "network" may be used interchangeably in this specification. The term "and/or" in this specification describes only an association relationship for describing associated objects and indicates that three relationships may exist. For example, A and/or B may represent the following three cases: Only A exists, both A and B exist, and only B exists. In addition, the character "/" in this specification generally indicates an "or" relationship between the associated objects.

The user-terminal-specific reference signal (UE-specific reference signal) and demodulation reference signal (DM-RS) in this specification may be interchangeable with each other, and for ease of description, the user-terminal-specific reference signal is used as an example in this specification for detailed description.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Embodiment 1

Embodiment 1 proposes a system for handling co-channel cell interference. As shown in FIG. 1, the system includes a network device and a UE.

The network device may be implemented as a base station (BS), an access point (AP), a remote radio equipment RRE), a remote radio head (RRH), a remote radio unit (RRU), a relay node, and the like. A relationship between network device and cell is not limited, where one network device may correspond to one or more cells, or one cell may correspond to one or more network devices. A sending or receiving operation of the network device may be a direct action of the network device, or the network device may control a device that is connected to the network device in a wired or wireless manner to indirectly perform the sending or receiving operation.

Each network device (such as a base station shown in FIG. 1) in the system shown in FIG. 1 may be classified into a network device of a non-serving cell or a network device of a serving cell. The network device of a non-serving cell means that the network device does not directly serves a given cell. The network device of a serving cell means that the network device directly serves a given cell. One network device may serve multiple cells at the same time. The serving cell refers to a cell that is currently serving the UE; likewise, the non-serving cell refers to a cell that is not currently serving the UE. One UE may have at least one non-serving cell. In the system architecture shown in FIG. 1, cell 1 serves UE1, base station 1 serves cell 1 to cell 3, and base station 2 serves cell 4 and cell 5. For UE1, cell 1 is a serving cell of UE1, base station 1 is a serving base station of cell 1 to cell 3, base station 2 is a non-serving cell base station of cell 1, and cell 2 to cell 5 are non-serving cells of UE1.

In the technical solution proposed in Embodiment 1, co-channel interference caused by a non-serving cell to a UE in a serving cell is used as an example for detailed description. The network device obtains interference information of the non-serving cell, and sends the obtained interference information of the non-serving cell to the UE. The interference information sent by the network device to the UE may be all or a part of the interference information obtained by the network device. In the case of partial interference information, the UE needs to learn other interference information by means of blind detection.

The technical solution proposed in Embodiment 1 may be further applied to co-channel interference brought by a paired UE to the UE, where the paired UE and the UE are located in a same serving cell. In specific implementation, the network device of the serving cell obtains all or a part of interference information of the paired UE, and sends all or a part of the obtained interference information of the paired UE to the UE, and the UE may handle, according to the received interference information, the co-channel interference brought by the paired UE that is located in the same serving cell as the UE. A specific handling manner in this case is the same as a manner in which the UE handles the co-channel interference caused by the non-serving cell to the UE in the serving cell. The following gives a detailed description by using an example in which the UE handles the co-channel interference caused by the non-serving cell to the UE in the serving cell.

For the serving cell in which the UE is currently located, the network device obtains the interference information of the non-serving cell, and maintains a correspondence between the obtained interference information and a cell identifier of the non-serving cell. The cell identifier includes a physical cell identifier (Physical Cell ID) or a virtual cell identifier (Virtual Cell ID). The network device determines, in the maintained correspondence between the interference information and the cell identifier of the non-serving cell, the cell identifier of the non-serving cell and the interference information of the non-serving cell, and sends the cell identifier of the non-serving cell to the UE as a generation parameter.

The UE determines a user-terminal-specific reference signal sequence of the non-serving cell according to the received generation parameter sent by the network device, performs channel estimation on a downlink transmission channel of the non-serving cell according to the user-terminal-specific reference signal sequence, and handles, according to an obtained channel estimation value, the co-channel interference brought by a downlink transmission signal of the non-serving cell to a downlink transmission signal of the serving cell.

For the serving cell in which the UE is currently located, the interference information refers to all information that is used to demodulate a downlink transmission channel and is sent by a network device that serves the non-serving cell to a UE in the cell that the network device serves. With respect to the serving cell in which the UE is currently located, for another UE that is located in the same serving cell and the same channel as the UE, the interference information refers to all information that is used to demodulate a downlink transmission channel and is sent by a network device that serves the serving cell to the another UE that is located in the same channel as the UE.

The downlink transmission channel includes a physical downlink shared channel (PDSCH), a physical broadcast channel (PBCH), a physical multicast channel (PMCH), a physical control format indicator channel (PCFICH), a physical downlink control channel (PDCCH), a physical hybrid ARQ indicator channel (PHICH), an enhanced physical downlink control channel (EPDCCH), and the like. For example, for the serving cell in which the UE is currently located, the interference information includes at least one of the following: the physical cell identifier of the non-serving cell, the virtual cell identifier of the non-serving cell, a generation parameter used in the non-serving cell to generate an initialization parameter of the user-terminal-specific reference signal sequence, information about an antenna port used in the non-serving cell to send the user-terminal-specific reference signal sequence, a generation parameter used in the non-serving cell to generate an initialization parameter of a channel state information-reference signal (CSI-RS) sequence, a quantity of antenna ports used in the non-serving cell to send a CSI-RS, a CSI-RS configuration used in the non-serving cell to send the CSI-RS, CSI-RS subframe configuration used in the non-serving cell to send the CSI-RS, a PDSCH scheduled-resource position of the non-serving cell, an EPDCCH scheduled-resource position of the non-serving cell, a modulation and coding scheme (MCS) used by the PDSCH of the non-serving cell, a rank used by the PDSCH of the non-serving cell, information about a PRB in which a transmission mode based on a user-terminal-specific reference signal sequence demodulation channel is used in the non-serving cell, information about an antenna port used in the non-serving cell to send the user-terminal-specific reference signal sequence, physical resource block bundling PRB bundling information of the non-serving cell, pilot data power ratio information of the non-serving cell, and the like. This information is interference information for the UE in the non-serving cell. For a UE, the network device may send all or a part of the obtained interference information to the UE in different manners, where the network device may be the network device that serves the serving cell, or may be the network device that serves the non-serving cell. In Embodiment 1, details are described by using an example in which the network device sending the interference information to the UE is the network device that serves the serving cell in which the UE is currently located, and the interference information includes one or more of the generation parameter, the information about the PRB in which the transmission mode based on the user-terminal-specific reference signal sequence demodulation channel is used in the non-serving cell, the information about the antenna port used in the non-serving cell to send the user-terminal-specific reference signal sequence, the physical resource block bundling PRB bundling information of the non-serving cell, and the pilot data power ratio information of the non-serving cell.

Because the interference information includes a relatively large amount of content, the network device that serves the serving cell in which the UE is currently located may send a part or all of the interference information to the UE. The UE may perform channel estimation on the downlink transmission channel of the non-serving cell according to the received part or all of the interference information, obtain other interference information for the UE by means of blind detection, and then handle, according to the obtained interference information and an obtained channel estimation value, the co-channel interference brought by the downlink transmission signal of the non-serving cell to the downlink transmission signal of the serving cell. Separate descriptions are provided in the following:

In a first manner, the network device obtains the interference information, where the interference information includes the generation parameter; and the network device sends the obtained interference information to the UE.

In this manner, the interference information sent by the network device to the UE includes the generation parameter, where the generation parameter is a parameter value used by the UE to determine the initialization parameter of the user-terminal-specific reference signal sequence of the non-serving cell. Generation of the user-terminal-specific reference signal sequence is associated with the generation parameter. The generation parameter may be the physical cell identifier or the virtual cell identifier of the non-serving cell.

The network device that serves the serving cell exchanges, through an interface, information with the network device that serves the non-serving cell, to obtain the generation parameter of the non-serving cell transmitted by the network device that serves the non-serving cell.

The UE receives the interference information of the non-serving cell that is sent by the network device and that includes the generation parameter, determines, according to the received generation parameter, the initialization parameter used to calculate the user-terminal-specific reference signal sequence of the non-serving cell, and determines the user-terminal-specific reference signal sequence of the non-serving cell according to the determined initialization parameter. The UE performs, in a position of a currently scheduled time-frequency resource of the serving cell and based on preset physical resource block bundling (PRB) information, blind detection on a physical resource block (PRB) of the non-serving cell, and obtains the information about the PRB in which the transmission mode based on the user-terminal-specific reference signal sequence demodulation channel is used in the non-serving cell. In the technical solution proposed in this embodiment, the user-terminal-specific reference signal is equivalent to a DM-RS, and for ease of description, DM-RS-based may be used to represent the transmission mode based on the user-terminal-specific reference signal sequence demodulation channel. In the obtained information about the PRB in which the transmission mode based on the user-terminal-specific reference signal sequence demodulation channel is used in the non-serving cell, the information about the antenna port, in each PRB corresponding to the PRB information, that is used in the non-serving cell to send the determined user-terminal-specific reference signal sequence is determined. A demodulation pilot sequence that is on the antenna port corresponding to the antenna port information and is used to demodulate a reference signal transmitted over the downlink transmission channel is obtained according to the determined information about the antenna port used in the non-serving cell to send the user-terminal-specific reference signal sequence. Blind detection is performed based on the preset PRB bundling information and according to the obtained demodulation pilot sequence on the corresponding antenna port, and channel estimation is performed on the downlink transmission channel of the non-serving cell. The co-channel interference brought by the downlink transmission signal of the non-serving cell to the downlink transmission signal of the serving cell is suppressed or cancelled according to the obtained channel estimation value and set pilot data power ratio information of the non-serving cell. The preset PRB bundling information may be PRB bundling of a fixed quantity of PRBs, for example, 1 PRB bundling, or may be the PRB bundling information of the non-serving cell that is obtained by the UE from the received interference information. The UE may assume, according to the PRB bundling information, PRBs that are applied with the same precoding, and further determine whether the PRBs may be combined to perform channel estimation. The set pilot data power ratio information of the non-serving cell may be a fixed value, for example, 1, or may be the pilot data power ratio information of the non-serving cell that is obtained by the UE from the received interference information. A method for suppressing or cancelling the co-channel interference brought by the downlink transmission signal of the non-serving cell to the downlink transmission signal of the serving cell includes performing estimation, cancellation, and the like on a user-terminal-specific reference signal of the non-serving cell.

The network device may be a base station. A base station that serves the serving cell may be referred to as a serving base station, and a base station that serves the non-serving cell may be referred to as a non-serving cell base station, which are hereinafter referred to as the serving base station and the non-serving cell base station for short.

The serving base station and the non-serving cell base station may exchange information with each other through an X2 interface, an S1 interface, or another interface, and the serving base station obtains the interference information transmitted by the non-serving cell base station. For example, the serving base station obtains the interference information that is transmitted by the non-serving cell base station and that includes the physical cell identifier or the virtual cell identifier of the non-serving cell, and the serving base station maintains the obtained interference information of the non-serving cell. The serving base station sends the obtained interference information of the non-serving cell to the UE by using radio resource control (RRC) signaling or downlink control information (DCI).

Specifically, in the first manner, details are described by using an example in which the interference information of the non-serving cell maintained by the serving base station is the generation parameter. The generation parameter may be the physical cell identifier or the virtual cell identifier of the non-serving cell. In specific implementation, the serving base station may maintain only the physical cell identifier of the non-serving cell, or maintain only the virtual cell identifier of the non-serving cell, or may maintain both the physical cell identifier and the virtual cell identifier of the non-serving cell. Table 1 shows the maintained physical cell identifier and virtual cell identifier of the non-serving cell.

TABLE 1

|   | Physical ID | DM-RS-ID |
|---|---|---|
| 1 | xx | [mm mm] |
| 2 | xx | [mm mm] |
| 3 | xx | [mm mm] |
| 4 | xx | [mm mm] |
| ... | ... | ... |

In the foregoing Table 1, Physical ID represents the physical cell identifier of the non-serving cell, and DM-RS-ID represents the virtual cell identifier corresponding to the physical cell identifier. "xx" in Table 1 represents a value ranging from 0 to 503. "mm" in Table 1 represents a value ranging from 0 to 503.

The UE receives the interference information of the non-serving cell that is sent by the serving base station and that includes the generation parameter, determines, according to the received generation parameter, the initialization parameter used to calculate the user-specific reference information sequence of the non-serving cell, and determines the user-terminal-specific reference signal sequence of the non-serving cell according to the determined initialization parameter. Specifically, for a specific implementation manner in which the UE suppresses or cancels, according to the received generation parameter, the co-channel interference brought by the downlink transmission signal of the non-serving cell to the downlink transmission signal of the serving cell, refer to the foregoing detailed descriptions. Details are not described herein again.

In a second manner, based on the foregoing first manner, the interference information of the non-serving cell may further include the information about the PRB in which the transmission mode based on the user-terminal-specific reference signal sequence demodulation channel is used in the non-serving cell. The network device obtains the information about the PRB in which the transmission mode based on the user-terminal-specific reference signal sequence demodulation channel is used in the non-serving cell, and sends the UE the obtained information about the PRB in which the transmission mode based on the user-terminal-specific reference signal sequence demodulation channel is used in the non-serving cell.

The transmission mode based on the user-terminal-specific reference signal sequence demodulation channel may be transmission mode (TM) 7, TM8, TM9, TM10, and the like.

The network device sends the obtained interference information to the UE, where the interference information of the non-serving cell that is sent by the network device to the UE includes the generation parameter and the information about the PRB in which the transmission mode based on the user-terminal-specific reference signal sequence demodulation channel is used in the non-serving cell. Generation of the user-terminal-specific reference signal sequence is associated with the generation parameter. The generation parameter is the parameter value used by the UE to determine the initialization parameter of the user-terminal-specific reference signal sequence of the non-serving cell. The generation parameter may include the physical cell identifier or the virtual cell identifier of the non-serving cell.

The network device that serves the serving cell exchanges, through an interface, information with the network device that serves the non-serving cell, to obtain the interference information of the non-serving cell transmitted by the network device that serves the non-serving cell. The network device maintains the obtained interference information of the non-serving cell, and the network device sends the UE the obtained interference information that includes the generation parameter and the information about the PRB in which the transmission mode based on the user-terminal-specific reference signal sequence demodulation channel is used in the non-serving cell.

The UE receives the interference information of the non-serving cell that is sent by the network device and that includes the generation parameter, determines, according to the received generation parameter, the initialization parameter used to calculate the user-terminal-specific reference signal sequence of the non-serving cell, and determines the user-terminal-specific reference signal sequence of the non-serving cell according to the determined initialization parameter. The UE determines, according to the determined information about the PRB in which the transmission mode based on the user-terminal-specific reference signal sequence demodulation channel is used in the non-serving cell, whether the DMRS-based transmission mode is used in the non-serving cell in the position of the currently scheduled time-frequency resource of the serving cell. If a result of the determining is yes, the UE performs, in the position of the currently scheduled time-frequency resource of the serving cell and based on the preset PRB bundling information, blind detection on the PRB corresponding to the information about the PRB in which the transmission mode based on the user-terminal-specific reference signal sequence demodulation channel is used in the non-serving cell; determines the antenna port, in each PRB, that is used in the non-serving cell to send the determined user-terminal-specific reference signal sequence; obtains, according to the determined antenna port used in the non-serving cell to send the determined user-terminal-specific reference signal sequence, the demodulation pilot sequence that is on the corresponding antenna port and is used to demodulate the reference signal transmitted over the downlink transmission channel; and performs channel estimation on the downlink transmission channel of the non-serving cell according to the obtained demodulation pilot sequence and based on the preset PRB bundling information. The UE suppresses or cancels, according to the obtained channel estimation value and the set pilot data power ratio information of the non-serving cell, the co-channel interference brought by the downlink transmission signal of the non-serving cell to the downlink transmission signal of the serving cell. If the result of the determining is no, it indicates that the DMRS-based transmission mode is not used in the non-serving cell in the position of the currently scheduled time-frequency resource of the serving cell, and the second manner proposed in Embodiment 1 is not used. For the preset PRB bundling information and the set pilot data power ratio information of the non-serving cell, refer to the detailed descriptions in the foregoing first manner. Details are not described herein again.

Specifically, details are described by still using an example in which the network device is a base station. The serving base station and the non-serving cell base station may exchange information with each other through the X2 interface, the S1 interface, or another interface. The serving base station obtains the physical cell identifier or the virtual cell identifier of the non-serving cell that is sent by the non-serving cell base station, and obtains the information, sent by the non-serving cell base station, about the PRB of the non-serving cell on which the transmission mode based on the user-terminal-specific reference signal sequence demodulation channel (which may be described by DMRS-based transmission mode) is used, that is, in which subframe the DMRS-based transmission mode is used in the non-serving cell. The serving base station maintains a correspondence between the obtained physical identifier or virtual cell identifier of the non-serving cell and the subframe in which the DMRS-based transmission mode is used in the non-serving cell. The serving base station sends the obtained interference information of the non-serving cell to the UE by using RRC signaling or DCI. Specifically, for the interference information of the non-serving cell that is maintained by the serving cell, reference may be specifically made to Table 2 as follows:

TABLE 2

| | Physical ID | DMRS-ID | DMRS-based Subframe |
|---|---|---|---|
| 1 | xx | [mm mm] | [yyyyy yyyyy] |
| 2 | xx | [mm mm] | [yyyyy yyyyy] |
| 3 | xx | [mm mm] | [yyyyy yyyyy] |
| 4 | xx | [mm mm] | [yyyyy yyyyy] |
| ... | ... | ... | ... |

In the foregoing Table 2, an implementation manner is given. The interference information maintained by the serving base station includes the physical cell identifier, the virtual cell identifier, and the information about the PRB in which the transmission mode based on the user-terminal-specific reference signal sequence demodulation channel is used in the non-serving cell. Physical ID represents the physical cell identifier of the non-serving cell, and DMRS-ID represents the virtual cell identifier corresponding to the physical cell identifier. The information about the PRB in which the DMRS-based transmission mode is used in the non-serving cell may be described by using "DMRS-based Subframe". "xx" in Table 2 represents a value ranging from 0 to 503. "mm" represents a value ranging from 0 to 503. A value of y is 0 or 1, and [yyyyy yyyyy] represents the subframe in which the non-serving cell will use the DMRS-based transmission mode. For example, [00000 11111] represents that the DMRS-based transmission mode is used in the non-serving cell in subframes 5 to 9. In specific implementation, the interference information maintained by the serving base station may be modified. For example, only the physical cell identifier and the information about the PRB in which the transmission mode based on the user-terminal-specific reference signal sequence demodulation channel is used in the non-serving cell are maintained, or the virtual cell identifier and the information about the PRB in which the transmission mode based on the user-terminal-specific reference signal sequence demodulation channel is used in the non-serving cell are maintained.

The UE determines, according to the received interference information sent by the serving base station and according to the received generation parameter, the initialization parameter used to calculate the user-specific reference information sequence of the non-serving cell, and determines the user-terminal-specific reference signal sequence of the non-serving cell according to the determined initialization parameter. Specifically, a specific implementation manner in which the UE suppresses or cancels, according to the received generation parameter and information about the PRB in which the transmission mode based on the user-terminal-specific reference signal sequence demodulation channel is used in the non-serving cell, the co-channel interference brought by the downlink transmission signal of the non-serving cell to the downlink transmission signal of the serving cell, refer to the foregoing detailed descriptions. Details are not described herein again.

In contrast with the foregoing first manner, in the foregoing second manner, when the UE suppresses or cancels the co-channel interference caused by the interference information of the non-serving cell to the serving cell, the interference information sent by the network device to the UE includes the generation parameter and the information about a resource in which the transmission mode based on the user-terminal-specific reference signal sequence demodulation channel is used in the non-serving cell. Compared with the first manner, the UE does not need to obtain, by means of blind detection, the information about the resource in which the transmission mode based on the user-terminal-specific reference signal sequence demodulation channel is used in the non-serving cell, and instead, the network device informs the UE of the information about the resource in which the transmission mode based on the user-terminal-specific reference signal sequence demodulation channel is used in the non-serving cell. Therefore, errors brought by blind detection performed by the UE are well reduced, and accuracy of handling, by the UE, the co-channel interference brought by the downlink transmission signal of the non-serving cell to the downlink transmission signal of the serving cell is further improved, thereby improving performance of the UE in demodulating a downlink channel.

In a third manner, with reference to the foregoing first or second manner, the interference information of the non-serving cell may further include the information about the antenna port used in the non-serving cell to send the user-terminal-specific reference signal sequence. The network device obtains the information about the antenna port used in the non-serving cell to send the user-terminal-specific reference signal sequence, and sends the information about the antenna port to the UE.

With reference to the foregoing first manner, the interference information of the non-serving cell that is sent by the network device to the UE includes the generation parameter and the information about the antenna port used in the non-serving cell to send the user-terminal-specific reference signal sequence. With reference to the foregoing second manner, the interference information of the non-serving cell that is sent by the network device to the UE includes the generation parameter, the information about the PRB in which the transmission mode based on the user-terminal-specific reference signal sequence demodulation channel is used in the non-serving cell, and the information about the antenna port used in the non-serving cell to send the user-terminal-specific reference signal sequence. Separate descriptions are provided in the following:

The network device that serves the serving cell exchanges, through an interface, information with the network device that serves the non-serving cell, to obtain the interference information of the non-serving cell transmitted by the network device that serves the non-serving cell. With reference to the foregoing first manner, the network device maintains the obtained interference information of the non-serving cell, and the network device sends the UE the obtained interference information that includes the generation parameter and the information about the antenna port used in the non-serving cell to send the user-terminal-specific reference signal sequence. With reference to the foregoing second manner, the obtained interference information is sent to the UE that includes the generation parameter, the information about the PRB in which the transmission mode based on the user-terminal-specific reference signal sequence demodulation channel is used in the non-serving cell, and the information about the antenna port used in the non-serving cell to send the user-terminal-specific reference signal sequence.

First, the UE receives the interference information of the non-serving cell that is sent by the network device and that includes the generation parameter, determines, according to the received generation parameter, the initialization parameter used to calculate the user-terminal-specific reference signal sequence of the non-serving cell, and determines the user-terminal-specific reference signal sequence of the non-serving cell according to the determined initialization parameter.

Second, the UE obtains the information about the PRB in which the transmission mode based on the user-terminal-specific reference signal sequence demodulation channel is used in the non-serving cell. The step may be performed in two implementation manners:

In a first implementation manner, with reference to the foregoing first manner, in the position of the currently scheduled time-frequency resource of the serving cell, blind detection is performed on PRBs of the non-serving cell based on the preset PRB bundling information, and the information about the PRB in which the transmission mode based on the user-terminal-specific reference signal sequence demodulation channel is used in the non-serving cell is obtained by means of the blind detection.

In a second implementation manner, with reference to the foregoing second manner, the interference information received by the UE includes the information about the PRB in which the transmission mode based on the user-terminal-specific reference signal sequence demodulation channel is used in the non-serving cell; therefore, the UE does not need to perform blind detection to learn the interference information.

After obtaining the information about the PRB in which the transmission mode based on the user-terminal-specific reference signal sequence demodulation channel is used in the non-serving cell, the UE determines, from the received information about the antenna port that is sent by the network device, the antenna port that is used in the non-serving cell to send the determined user-terminal-specific reference signal sequence in each PRB corresponding to the information about the PRB in which the transmission mode based on the user-terminal-specific reference signal sequence demodulation channel is used in the non-serving cell, and obtains, according to the determined antenna port used in the non-serving cell to send the user-terminal-specific reference signal sequence, the demodulation pilot sequence that is on the corresponding antenna port and is used to demodulate the reference signal transmitted over the downlink transmission channel. The UE performs channel estimation on the downlink transmission channel of the non-serving cell according to the obtained demodulation pilot sequence and based on the preset PRB bundling information. The UE suppresses or cancels, according to the obtained channel estimation value and the set pilot data power ratio information of the non-serving cell, the co-channel interference brought by the downlink transmission signal of the non-serving cell to the downlink transmission signal of the serving cell. For the preset PRB bundling information and the set pilot data power ratio information of the non-serving cell, refer to the detailed descriptions in the foregoing first manner. Details are not described herein again.

Specifically, details are described by still using the example in which the network device is the base station. The serving base station and the non-serving cell base station may exchange information with each other through the X2 interface, the S1 interface, or another interface. Details are described by using an example in which the serving base station obtains the physical cell identifier or the virtual cell identifier of the non-serving cell that is sent by the non-serving cell base station, and obtains the information about the antenna port (which may be described by using "DMRS port") used in the non-serving cell to send the user-terminal-specific reference signal sequence. The serving base station maintains a correspondence between the obtained physical identifier or virtual cell identifier of the non-serving cell and the information about the antenna port used in the non-serving cell to send the user-terminal-specific reference signal sequence. The serving base station sends the obtained interference information of the non-serving cell to the UE by using RRC signaling or DCI. Specifically, for the interference information of the non-serving cell that is maintained by the serving cell, reference may be specifically made to Table 3 as follows:

TABLE 3

| | Physical ID | DMRS-ID | DMRS port |
|---|---|---|---|
| 1 | xx | [mm mm] | Port 7, Nscid = 0 |
| 2 | xx | [mm mm] | Port 7, Nscid = 1 |
| 3 | xx | [mm mm] | Port 8, Nscid = 0 |
| 4 | xx | [mm mm] | Port 7, Nscid = 0 |
| | | | Port 8, Nscid = 0 |
| ... | ... | ... | ... |

In the foregoing Table 3, Physical ID represents the physical cell identifier of the non-serving cell, and DMRS-ID represents the virtual cell identifier corresponding to the physical cell identifier. The information about the antenna port used in the non-serving cell to send the user-terminal-specific reference signal sequence may be described by using "DMRS port". In Table 3, "xx" represents a value ranging from 0 to 503, "mm" represents a value ranging from 0 to 503, "Port" represents the antenna port used to send the user-terminal-specific reference signal sequence, and "Nscid" represents a scrambling code ID mapping indication.

The UE determines, according to the received interference information sent by the serving base station and according to the received generation parameter, the initialization parameter used to calculate the user-specific reference information sequence of the non-serving cell, and determines the user-terminal-specific reference signal sequence of the non-serving cell according to the determined initialization parameter. Specifically, for a specific implementation manner in which the UE suppresses or cancels, according to the received interference information, the co-channel interference brought by the downlink transmission signal of the non-serving cell to the downlink transmission signal of the serving cell, refer to the foregoing detailed descriptions. Details are not described herein again.

In contrast with the foregoing first manner, in the foregoing third manner, when the UE suppresses or cancels the co-channel interference caused by the interference information of the non-serving cell to the serving cell, the interference information sent by the network device to the UE includes the generation parameter and the information about the antenna port used in the non-serving cell to send the user-terminal-specific reference signal sequence. The UE does not need to perform blind detection to obtain the information about the antenna port used in the non-serving cell to send the user-terminal-specific reference signal sequence; therefore, an error brought by blind detection is well avoided.

When the UE suppresses or cancels the co-channel interference from the non-serving cell, a handling effect depends on accuracy of channel estimation performed by the UE on the downlink transmission channel of the non-serving cell. Because of a situation in which PDSCH transmission based on a user-terminal-specific reference signal sequence is used in the non-serving cell, to obtain a relatively high performance gain, when the UE performs estimation on the downlink transmission channel of the non-serving cell, if the UE can learn the PRB bundling information, the accuracy of estimation performed by the UE on the downlink transmission channel of the non-serving cell may be further improved, thereby obtaining a better effect in suppressing or cancelling the co-channel interference. However, an existing protocol cannot support such an assumption mainly because of the following first reason or second reason:

First reason: Existence of an EPDCCH causes it impossible to perform blind detection of PRB bundling for channel estimation of the non-serving cell in the existing protocol.

Figure 2:
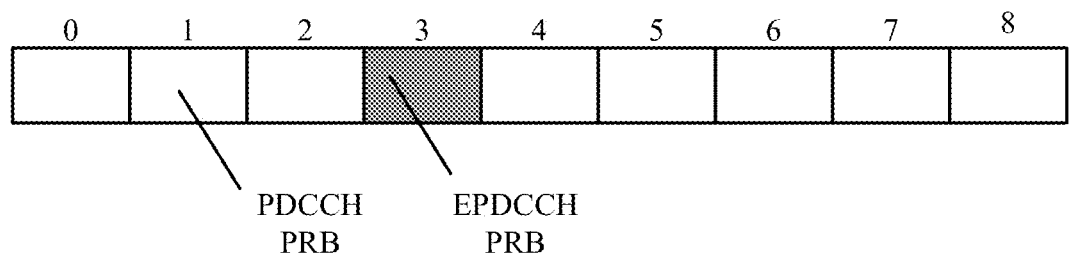
FIG. 2 is a schematic structural diagram of a PRB occupied by an EPDCCH.

The EPDCCH is discrete during resource scheduling, which damages continuity of data transmitted over the PDSCH. As shown in FIG. 2, if a size of PRB bundling of the non-serving cell is three PRBs, when the EPDCCH occupies the fourth PRB, the UE can separately perform, based on the assumption of 3-PRB bundling, blind detection on a group of PRBs whose identifiers are 0, 1, and 2, and a group of PRBs whose identifiers are 6, 7, and 8, but cannot perform, based on the assumption of 3-PRB bundling, blind detection on a group of PRBs whose identifiers are 3, 4, and 5; otherwise, channel estimation for the group of PRBs whose identifiers are 3, 4, and 5 will be incorrect, thereby causing a performance loss.

Second reason: A resource scheduling manner of the non-serving cell results that the existing protocol cannot support channel estimation for the non-serving cell based on an assumption of PRB bundling.

Figure 3:
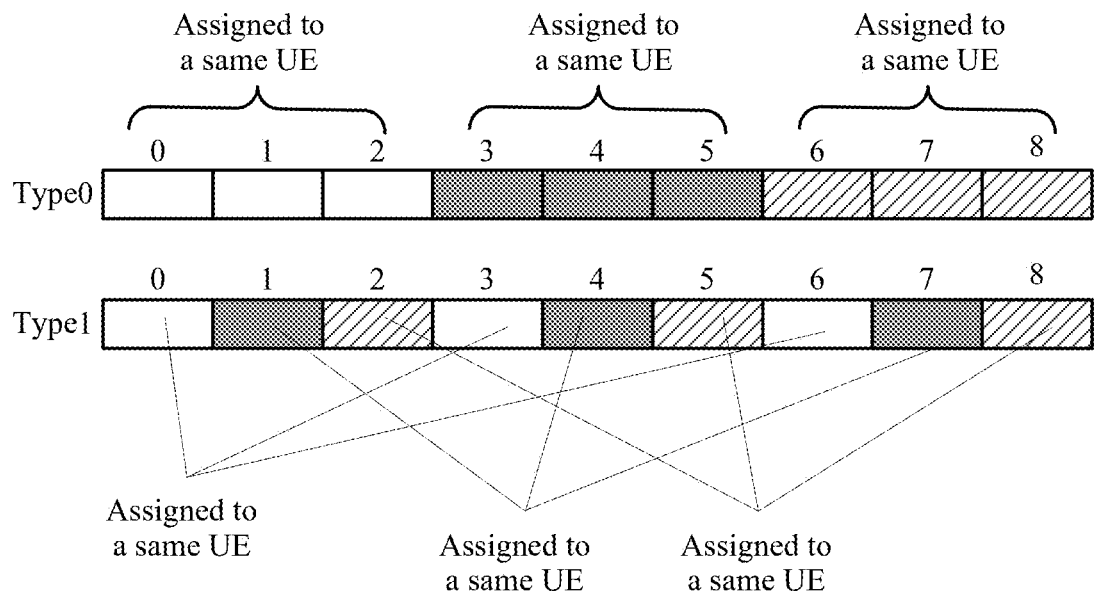
FIG. 3 shows different manners in which a resource of a non-serving cell is scheduled.

For a PDSCH that is transmitted based on the user-terminal-specific reference signal sequence, as shown in FIG. 3, there are two resource assignment manners: One is a resource assignment manner of Type 0, where the base station always performs resource assignment by assigning three consecutive PRBs to one UE; the other one is a resource assignment manner of Type 1, where the base station allocates resources inconsecutively. As shown in FIG. 3, a schematic diagram of the two resource assignment manners is given. In an example of 10M bandwidth, it may be seen that, if the base station schedules resources in the Type 0 manner, the UE may make the assumption of 3-PRB bundling, and if the base station schedules resources in the Type 1 manner, the UE cannot make the assumption of 3-PRB bundling.

When the UE performs channel estimation on the downlink transmission channel of the non-serving cell, the PRB bundling information exerts an effect on the accuracy of a channel estimation result. For example, when each three PRBs are applied with the same precoding, accuracy of channel estimation based on three PRBs is higher than accuracy of channel estimation based on one PRB. If each PRB and an adjacent PRB are precoded in different manners, in this case, if channel estimation is performed based on more than one PRB, an obtained channel estimation value is inaccurate; therefore, if the base station schedules resources in the Type 1 manner, channel estimation can be performed based on only one PRB.

However, in the foregoing three manners, after receiving the part of interference information sent by the network device, the UE needs to perform blind detection on PRBs of the non-serving cell based on the preset PRB bundling information, and the preset PRB bundling information is also used when channel estimation is performed. In view of this, further, the network device may inform the UE of the preset PRB bundling information by using signaling; further, based on any one of the foregoing three manners, the network device may further send the interference information to the UE in the following fourth manner:

In the fourth manner, the interference information of the non-serving cell may further include the PRB bundling information of the non-serving cell. The network device obtains the PRB bundling information of the non-serving cell, and sends the obtained PRB bundling information of the non-serving cell to the UE.

With reference to the foregoing first manner, the interference information of the non-serving cell that is sent by the network device to the UE includes the generation parameter and the PRB bundling information of the non-serving cell. With reference to the foregoing second manner, the interference information of the non-serving cell that is sent by the network device to the UE includes the generation parameter, the information about the antenna port used in the non-serving cell to send the user-terminal-specific reference signal sequence, and the PRB bundling information of the non-serving cell. With reference to the foregoing third manner, the interference information of the non-serving cell that is sent by the network device to the UE includes the generation parameter, the information about the PRB in which the transmission mode based on the user-terminal-specific reference signal sequence demodulation channel is used in the non-serving cell, the information about the antenna port used in the non-serving cell to send the user-terminal-specific reference signal sequence, and the PRB bundling information of the non-serving cell. Separate descriptions are provided in the following:

The network device that serves the serving cell exchanges, through an interface, information with the network device that serves the non-serving cell, to obtain the interference information of the non-serving cell transmitted by the network device that serves the non-serving cell. The network device maintains the obtained generation parameter and PRB bundling information of the non-serving cell, and sends the UE the obtained interference information that includes the generation parameter and the PRB bundling information of the non-serving cell.

A manner in which the network device sends the interference information of the non-serving cell to the UE includes at least one of the following, A: The network device sends, by using DCI or RRC signaling, an indication message used to indicate to the UE whether the PRB bundling information can be used in the non-serving cell.

B: The network device sends, by using DCI or RRC signaling, a notification message used to notify the UE that the PRB bundling information can be used on a specific time domain resource of the non-serving cell within a set time period.

In this manner, the network device that is currently serving the UE and the network device that is currently not serving the UE may perform resource scheduling and coordination with each other, and if the network device informs the UE that the PRB bundling information can be used, the PRB bundling information can be used in all the specific time domain resources.

C: The network device sends, by using DCI or RRC signaling, a notification message used to notify the UE that the PRB bundling information can be used on a time-frequency resource of the non-serving cell.

In this manner, the network device informs, by using the notification message, the UE of information about the time-frequency resource on which the PRB bundling information can be used, that is, informing the UE of the time-frequency resource on which the PRB bundling information can be used.

D: The network device sends, by using DCI or RRC signaling, a notification message used to notify the UE of configuration information of an enhanced physical downlink control channel EPDCCH of the non-serving cell, where the UE learns, according to the received configuration information of the EPDCCH of the non-serving cell, whether the PRB bundling information can be used in the non-serving cell, that is, the PRB bundling information cannot be used in the non-serving cell on an EPDCCH configuration resource.

With reference to the three manners described above, the UE may determine, according to the received interference information sent by the network device and based on the information, sent by the base station, of using PRB bundling in the non-serving cell, a PRB on which PRB bundling can be used in the non-serving cell, and perform detection on the PRB on which PRB bundling can be used, so as to implement channel estimation performed on the downlink transmission channel of the non-serving cell, and suppress or cancel, according to the obtained channel estimation value and the set pilot data power ratio information of the non-serving cell, the co-channel interference brought by the downlink transmission signal of the non-serving cell to the downlink transmission signal of the serving cell. The set pilot data power ratio information of the non-serving cell may be a fixed value, for example, 1.

Specifically, details are described by still using the example in which the network device is the base station. The serving base station and the non-serving cell base station may exchange information with each other through the X2 interface, the S1 interface, or another interface, and the serving base station obtains the physical cell identifier or the virtual cell identifier of the non-serving cell that is sent by the non-serving cell base station, and obtains the PRB bundling information of the non-serving cell. The serving base station maintains a correspondence between the obtained physical identifier or virtual cell identifier of the non-serving cell and the PRB bundling information of the non-serving cell. The serving base station sends the obtained interference information of the non-serving cell to the UE by using RRC signaling or DCI. For the interference information of the non-serving cell that is maintained by the serving cell, reference may be specifically made to Table 4 as follows:

TABLE 4

| | Physical ID | DMRS-ID | PRB bundling information |
|---|---|---|---|
| 1 | xx | [mm mm] | [zzzzz zzzzz] |
| 2 | xx | [mm mm] | [zzzzz zzzzz] |
| 3 | xx | [mm mm] | [zzzzz zzzzz] |
| 4 | xx | [mm mm] | [zzzzz zzzzz] |
| ... | ... | ... | ... |

In the foregoing Table 4, Physical ID represents the physical cell identifier of the non-serving cell, and DMRS-ID represents the virtual cell identifier corresponding to the physical cell identifier. In Table 4, "xx" represents a value ranging from 0 to 503, "mm" represents a value ranging from 0 to 503, a value of z is 0 or 1, and [zzzzz zzzzz] represents a subframe in which the PRB bundling information can be used for channel estimation of the non-serving cell. For example, [00000 11111] represents that the PRB bundling information can be used for the channel estimation of the non-serving cell in subframes 5 to 9.

The base station may send the maintained interference information to the UE, where the base station may send the maintained interference information to the UE in at least one of the following manners:

A: The base station sends, by using DCI or RRC signaling, an indication message used to indicate whether the PRB bundling information can be used in the non-serving cell by the UE.

For example, the base station occupies one bit in the RRC signaling or the DCI to send the indication message that indicates whether PRB bundling can be used by the UE for a current PRB of the non-serving cell. "0" may be used to indicate to the UE that 1 PRB bundling information cannot be used. "1" may be used to indicate to the UE that 1 PRB bundling information can be used, so as to implement channel estimation on the downlink transmission channel of the non-serving cell and obtain the channel estimation value.

B: The base station sends, by using DCI or RRC signaling, a notification message used to notify the UE that the PRB bundling information can be used on a specific time domain resource of the non-serving cell within a set time period.

Figure 4:
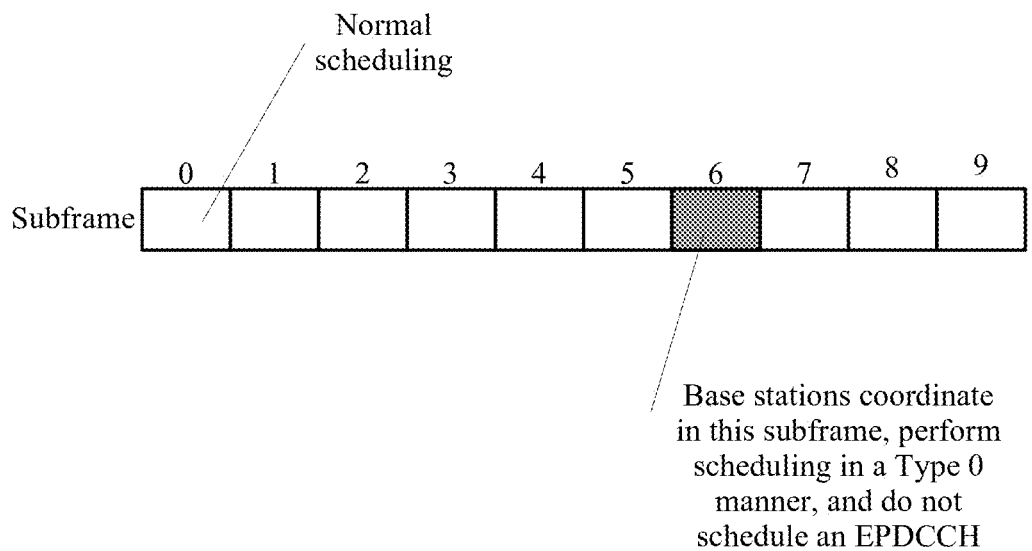
FIG. 4 is a schematic diagram of PRB occupation in a subframe when base stations perform scheduling and transmission with each other in accordance with an agreed mode according to Embodiment 1.

The serving base station and the non-serving cell base station may perform scheduling and transmission with each other in accordance with an agreed mode, notify, by using the RRC signaling or the DCI, the UE of PRB bundling information of the non-serving cell in one subframe. As shown in FIG. 4, if the base station schedules the UE in subframe 6, the base station may notify the UE of [00000 01000] and inform the UE that the PRB bundling information can be used for a PRB of the non-serving cell in subframe 6, and the PRB bundling information cannot be used for a PRB of the non-serving cell in another subframe.

C: The base station sends, by using DCI or RRC signaling, a notification message used to notify the UE that the PRB bundling information can be used on a time-frequency resource of the non-serving cell.

In this manner, the serving base station and the non-serving cell base station reach a mutual agreement, notify the UE of a PRB of the non-serving cell on which PRB Bundling is used, and notify, by using the RRC signaling or the DCI, the UE of a time-frequency resource position (for example, Subframe/PRB pattern) on which the PRB bundling information can be used when channel estimation is performed on the downlink transmission channel of the non-serving cell.

D: The base station sends, by using DCI or RRC signaling, a notification message used to notify the UE of configuration information of an EPDCCH of the non-serving cell, where the UE learns, according to the received configuration information of the EPDCCH of the non-serving cell, whether the PRB bundling information can be used in the non-serving cell.

After performing exchange with the non-serving cell base station and acquiring scheduling information of the EPDCCH of the non-serving cell, the serving base station notifies, by using the RRC signaling or the DCI, the UE of the configuration information of the EPDCCH of the non-serving cell, for example, informing the UE of information about a time-frequency resource position on which the EPDCCH of the non-serving cell is located, and the like. After acquiring the configuration information of the EPDCCH of the non-serving cell, the UE learns the time-frequency resource position (for example, Subframe/PRB pattern) on which a time-frequency resource of the EPDCCH should be avoided when channel estimation is performed on the non-serving cell. Alternatively, the base station notifies the UE of all configuration information of the EPDCCH of the non-serving cell, and the UE separately performs, by using the obtained configuration information of the EPDCCH of the non-serving cell, channel estimation for a PRB occupied by the EPDCCH.

With reference to the three manners described above, the UE may determine, according to the received interference information sent by the serving base station and based on the information, sent by the base station, of using PRB bundling in the non-serving cell, a PRB that is of the non-serving cell and on which the PRB bundling information can be used, and perform detection on the PRB on which the PRB bundling information can be used, so as to implement channel estimation performed on the downlink transmission channel of the non-serving cell, and suppress or cancel, according to the obtained channel estimation value and the set pilot data power ratio information of the non-serving cell, the co-channel interference brought by the downlink transmission signal of the non-serving cell to the downlink transmission signal of the serving cell. Specifically, refer to the foregoing detailed descriptions. Details are not described herein again.

In the foregoing detailed descriptions of the first manner to the fourth manner, after performing channel estimation on the downlink transmission channel of the non-serving cell, the UE suppresses or cancels, according to the obtained channel estimation value and the set pilot data power ratio information of the non-serving cell, the co-channel interference brought by the downlink transmission signal of the non-serving cell to the downlink transmission signal of the serving cell.

Further, the set pilot data power ratio information of the non-serving cell may further be delivered by the network device to inform the UE. Further, based on the foregoing first manner to the fourth manner, the network device may send the interference information to the UE in the following fifth manner:

In the fifth manner, the interference information sent by the network device to the UE may further include the pilot data power ratio information of the non-serving cell. This manner may be used in combination with any one of the foregoing first manner to the fourth manner. The network device sends the obtained interference information to the UE, where the interference information of the non-serving cell that is sent by the network device to the UE includes the generation parameter and the pilot data power ratio information of the non-serving cell. The generation parameter may include the physical cell identifier or the virtual cell identifier of the non-serving cell. The pilot data power ratio information of the non-serving cell may be a pilot data power ratio, or may be a public parameter (PB) configured by a higher layer of the non-serving cell and a quantity of antenna ports of cell-specific reference signals (CRSs) of the non-serving cell.

The network device that serves the serving cell exchanges, through an interface, information with the network device that serves the non-serving cell, to obtain the interference information of the non-serving cell transmitted by the network device that serves the non-serving cell. The network device maintains a correspondence between the obtained interference information and the cell identifier of the non-serving cell, and the network device sends the UE the obtained interference information that includes the generation parameter and the pilot data power ratio information of the non-serving cell.

The UE performs handling in any one of the foregoing first manner to the fourth manner according to the received interference information sent by the base station, and when the co-channel interference brought by a signal transmitted in the non-serving cell to a signal transmitted in the serving cell is handled according to the obtained channel estimation value and with reference to the pilot data power ratio information of the non-serving cell, corresponding handling is performed by using the pilot data power ratio information of the non-serving cell included in the interference information sent from the network device in the fifth manner.

Details are described by still using the example in which the network device is the base station. The serving base station and the non-serving cell base station may exchange information with each other through the X2 interface, the S1 interface, or another interface, and the serving base station obtains the physical cell identifier or the virtual cell identifier of the non-serving cell that is sent by the non-serving cell base station, and obtains the pilot data power ratio information of the non-serving cell. The serving base station maintains the obtained physical identifier or virtual cell identifier of the non-serving cell and the obtained pilot data power ratio information of the non-serving cell. The serving base station sends the obtained interference information of the non-serving cell to the UE by using RRC signaling or DCI. Specifically, for the interference information of the non-serving cell that is maintained by the serving cell, reference may be specifically made to Table 5 as follows:

TABLE 5

| | Physical ID | Pilot data power ratio information |
|---|---|---|
| 1 | xx | ~ |
| 2 | xx | ~ |
| 3 | xx | ~ |
| 4 | xx | ~ |
| ... | ... | ... |

In the foregoing Table 5, Physical ID represents the physical cell identifier of the non-serving cell, and "xx" in Table 5 represents a value ranging from 0 to 503.

The base station may send the maintained interference information to the UE. After performing channel estimation on the downlink transmission channel of the non-serving cell according to the received interference information sent by the serving base station with reference to any one of the four manners described above, the UE suppresses or cancels, according to the obtained channel estimation value and the pilot power ratio information of the non-serving cell that is delivered by the base station, the co-channel interference brought by the downlink transmission signal of the non-serving cell to the downlink transmission signal of the serving cell.

Embodiment 2

Figure 5:
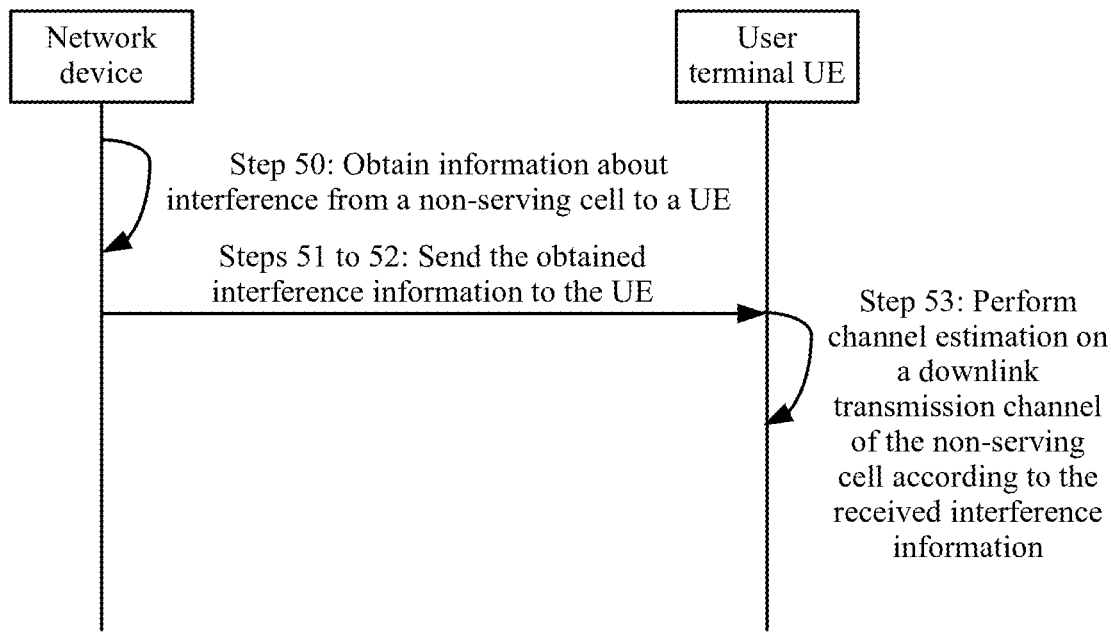
FIG. 5 is a flowchart of a method for handling co-channel cell interference according to Embodiment 2.

Based on the system proposed in the foregoing Embodiment 1, Embodiment 2 proposes a method for handling co-channel cell interference. As shown in FIG. 5, a specific processing procedure of the method is as follows:

Step 50: A network device obtains information about interference from a non-serving cell to a UE.

Step 51: The network device sends the obtained interference information to the UE.

In the foregoing step 50 to step 51, the interference information includes a generation parameter, where the generation parameter is a parameter value used to determine an initialization parameter of a user-terminal-specific reference signal sequence of the non-serving cell. The generation parameter may be a physical cell identifier or a virtual cell identifier of the non-serving cell.

For a specific processing process of obtaining the generation parameter by the network device, refer to the detailed descriptions in the foregoing Embodiment 1, which is not described again in Embodiment 2.

The interference information obtained by the network device may further include at least one type of the following information:

A: information about a physical resource block PRB in which a transmission mode based on a user-terminal-specific reference signal sequence demodulation channel is used in the non-serving cell.

B: information about an antenna port used in the non-serving cell to send the user-terminal-specific reference signal sequence.

C: physical resource block bundling PRB bundling information of the non-serving cell.

The PRB bundling information of the non-serving cell includes at least one of the following:

C1: information about whether PRB bundling can be used in the non-serving cell;

C2: information that PRB bundling can be used on a specific time domain resource of the non-serving cell within a set time period; and C3: information that PRB bundling can be used on a time-frequency resource of the non-serving cell.

In the foregoing three manners, the network device directly sends the PRB bundling information of the non-serving cell to the UE. For a specific processing process of sending the foregoing three forms of PRB bundling information of the non-serving cell by the network device, refer to the detailed descriptions in the foregoing Embodiment 1, which is not described again in Embodiment 2.

In addition to the foregoing three manners, the network device may further inform the UE of the PRB bundling information of the non-serving cell in an implicit mapping manner, which is specifically: sending configuration information of an enhanced physical downlink control channel EPDCCH of the non-serving cell to the UE, where the configuration information of the EPDCCH is information used by the UE to learn, according to the configuration information of the EPDCCH, whether PRB bundling can be used in the non-serving cell.

D: pilot data power ratio information of the non-serving cell.

Specifically, for a specific implementation manner of obtaining the foregoing several types of interference information by the network device, refer to the detailed descriptions in the foregoing Embodiment 1, which is not described again in Embodiment 2.

Step 52: The UE receives the interference information sent by the network device.

Step 53: The UE handles, according to the received interference information, co-channel interference brought by a downlink transmission signal of the non-serving cell to a downlink transmission signal of a serving cell.

For the serving cell in which the UE is currently located, the interference information refers to all information that is used to demodulate a PDSCH and is sent by a network device that serves the non-serving cell to a UE in the cell that the network device serves. Details are described in Embodiment 2 by using an example in which the network device that sends the interference information to the UE is a network device that serves the serving cell in which the UE is currently located.

Because the interference information includes a relatively large amount of content, the network device may send a part or all of the interference information to the UE. The UE may perform channel estimation on a downlink transmission channel of the non-serving cell according to the received part or all of the interference information, and handle, according to an obtained channel estimation value, the co-channel interference brought by the downlink transmission signal of the non-serving cell to the downlink transmission signal of the serving cell.

The UE determines the user-terminal-specific reference signal sequence of the non-serving cell according to the received generation parameter, performs channel estimation on the downlink transmission channel of the non-serving cell according to the determined user-terminal-specific reference signal sequence, and handles, according to the obtained channel estimation value and the pilot data power ratio information of the non-serving cell, the co-channel interference brought by the downlink transmission signal of the non-serving cell to the downlink transmission signal of the serving cell.

Specifically, the UE may obtain a demodulation pilot sequence in a position of a currently scheduled time-frequency resource of the serving cell and based on the physical resource block bundling PRB bundling information, the information about the PRB in which the transmission mode based on the user-terminal-specific reference signal sequence demodulation channel is used in the non-serving cell, and the information about the antenna port used in the non-serving cell to send the determined user-terminal-specific reference signal sequence, where the demodulation pilot sequence is on the antenna port corresponding to the antenna port information and is used to demodulate a reference signal transmitted over the downlink transmission channel; and perform channel estimation on the downlink transmission channel of the non-serving cell according to the obtained demodulation pilot sequence and based on the PRB bundling information.

Correspondingly, according to the received interference information, the PRB bundling information may be bundling of a preset fixed quantity of PRBs; or the PRB bundling information is obtained from the received interference information.

Correspondingly, according to the received interference information, the information about the PRB in which the transmission mode based on the user-terminal-specific reference signal sequence demodulation channel is used in the non-serving cell is obtained from the received interference information; or the information about the PRB in which the transmission mode based on the user-terminal-specific reference signal sequence demodulation channel is used in the non-serving cell is obtained by performing blind detection on a physical resource block PRB of the non-serving cell based on the PRB bundling information.

Correspondingly, according to the received interference information, the information about the antenna port used in the non-serving cell to send the user-terminal-specific reference signal sequence is obtained from the received interference information; or the information about the antenna port used in the non-serving cell to send the user-terminal-specific reference signal sequence is obtained by performing blind detection on a PRB of the non-serving cell based on the PRB bundling information.

Correspondingly, according to the received interference information, the pilot data power ratio information of the non-serving cell is obtained from the received interference information; or the pilot data power ratio information of the non-serving cell is a preset fixed value.

Specifically, for a specific implementation manner of handling, by the UE after receiving the part or all of the interference information sent by the network device, the co-channel interference according to the received interference information, refer to the detailed descriptions in the first manner to the fifth manner in the foregoing Embodiment 1, which is not described again in Embodiment 2.

Embodiment 3

Figure 6:
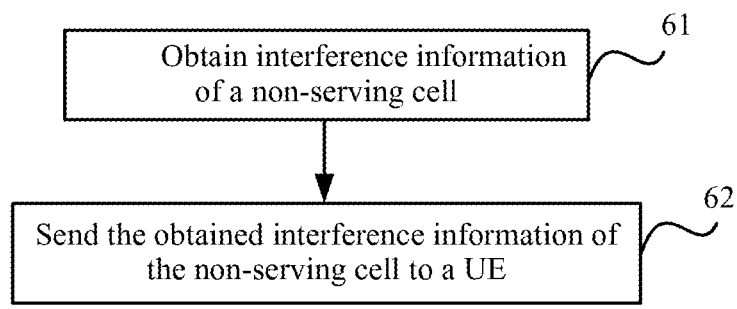
FIG. 6 is a flowchart of a method for handling co-channel cell interference by a network device according to Embodiment 3.

Embodiment 3 proposes a method for handling co-channel cell interference. As shown in FIG. 6, a specific processing process of the method is as follows:

Step 61: Obtain interference information of a non-serving cell.

Step 62: Send the obtained interference information of the non-serving cell to the UE.

The interference information includes a generation parameter, where the generation parameter is a parameter value used to determine an initialization parameter of a user-terminal-specific reference signal sequence of the non-serving cell. The generation parameter may be a physical cell identifier or a virtual cell identifier of the non-serving cell.

For a specific processing process of obtaining the generation parameter by the network device, refer to the detailed descriptions in the foregoing Embodiment 1, which is not described again in Embodiment 2 of the present invention.

The interference information obtained by the network device may further include at least one type of the following information:

A: information about a physical resource block PRB in which a transmission mode based on a user-terminal-specific reference signal sequence demodulation channel is used in the non-serving cell.

B: information about an antenna port used in the non-serving cell to send the user-terminal-specific reference signal sequence.

C: physical resource block bundling PRB bundling information of the non-serving cell.

The PRB bundling information of the non-serving cell includes at least one of the following:

C1: information about whether PRB bundling can be used in the non-serving cell;

C2: information that PRB bundling can be used on a specific time domain resource of the non-serving cell within a set time period; and C3: information that PRB bundling can be used on a time-frequency resource of the non-serving cell.

In the foregoing three manners, the network device directly sends the PRB bundling information of the non-serving cell to the UE. For a specific processing process of sending the foregoing three forms of PRB bundling information of the non-serving cell by the network device, refer to the detailed descriptions in the foregoing Embodiment 1, which is not described again in Embodiment 2.

In addition to the foregoing three manners, the network device may further inform the UE of the PRB bundling information of the non-serving cell in an implicit mapping manner, which is specifically: sending configuration information of an enhanced physical downlink control channel EPDCCH of the non-serving cell to the UE, where the configuration information of the EPDCCH is information used by the UE to learn, according to the configuration information of the EPDCCH, whether PRB bundling can be used in the non-serving cell.

D: pilot data power ratio information of the non-serving cell.

Specifically, for a specific implementation manner of obtaining the foregoing several types of interference information by the network device, refer to the detailed descriptions in the foregoing Embodiment 1, which is not described again in Embodiment 3.

Figure 7:
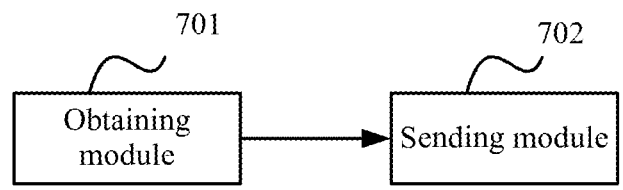
FIG. 7 is a schematic structural diagram of an apparatus for handling co-channel cell interference on a network side according to Embodiment 3.

Correspondingly, Embodiment 3 further proposes an apparatus for handling co-channel cell interference. As shown in FIG. 7, a specific structure of the apparatus is as follows:

An obtaining module 701 is configured to: obtain interference information of a non-serving cell, and transmit the obtained interference information to a sending module 702, where the interference information includes a generation parameter, and the generation parameter is a parameter value used to determine an initialization parameter of a user-terminal-specific reference signal sequence of the non-serving cell.

Specifically, the generation parameter obtained by the foregoing obtaining module 701 is a physical cell identifier or a virtual cell identifier of the non-serving cell.

Specifically, the interference information obtained by the foregoing obtaining module 701 further includes at least one type of the following information: information about a physical resource block PRB in which a transmission mode based on a user-terminal-specific reference signal sequence demodulation channel is used in the non-serving cell; information about an antenna port used in the non-serving cell to send the user-terminal-specific reference signal sequence; physical resource block bundling PRB bundling information of the non-serving cell; and pilot data power ratio information of the non-serving cell.

Specifically, the PRB bundling information of the non-serving cell obtained by the foregoing obtaining module 701 includes at least one of the following: information about whether PRB bundling can be used in the non-serving cell; information that PRB bundling can be used on a specific time domain resource of the non-serving cell within a set time period; and information that PRB bundling can be used on a time-frequency resource of the non-serving cell.

The sending module 702 is configured to: receive the interference information transmitted by the obtaining module 701, and send the obtained interference information of the non-serving cell to a user terminal UE.

Specifically, the foregoing sending module 702 is specifically configured to send configuration information of an enhanced physical downlink control channel EPDCCH of the non-serving cell to the UE, where the configuration information of the EPDCCH is information used by the UE to learn, according to the configuration information of the EPDCCH, whether PRB bundling can be used in the non-serving cell.

Figure 8:
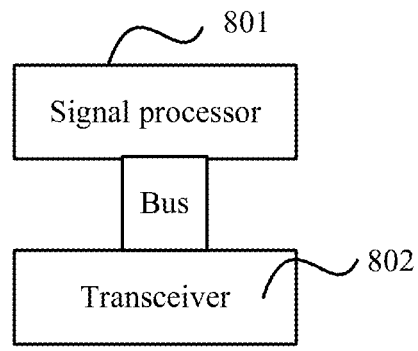
FIG. 8 is a schematic structural diagram of a base station according to Embodiment 3.

Correspondingly, Embodiment 3 further proposes a base station. As shown in FIG. 8, the base station includes a signal processor 801 and a transceiver 802. The signal processor 801 and the transceiver 802 are connected by using a bus to transmit data, and a specific structure of the signal processor 801 and the transceiver 802 is as follows:

The signal processor 801 is configured to: obtain interference information of a non-serving cell, and transmit the obtained interference information to the transceiver 802, where the interference information includes a generation parameter, and the generation parameter is a parameter value used to determine an initialization parameter of a user-terminal-specific reference signal sequence of the non-serving cell.

Specifically, the generation parameter obtained by the foregoing signal processor 801 is a physical cell identifier or a virtual cell identifier of the non-serving cell.

Specifically, the interference information obtained by the foregoing signal processor 801 further includes at least one type of the following information: information about a physical resource block PRB in which a transmission mode based on a user-terminal-specific reference signal sequence demodulation channel is used in the non-serving cell; information about an antenna port used in the non-serving cell to send the user-terminal-specific reference signal sequence; physical resource block bundling PRB bundling information of the non-serving cell; and pilot data power ratio information of the non-serving cell.

Specifically, the PRB bundling information of the non-serving cell obtained by the foregoing signal processor 801 includes at least one of the following: information about whether PRB bundling can be used in the non-serving cell; information that PRB bundling can be used on a specific time domain resource of the non-serving cell within a set time period; and information that PRB bundling can be used on a time-frequency resource of the non-serving cell.

The transceiver 802 is configured to: receive the interference information transmitted by the signal processor 801, and send the obtained interference information of the non-serving cell to a user terminal UE.

Specifically, the foregoing transceiver 802 is specifically configured to send configuration information of an enhanced physical downlink control channel EPDCCH of the non-serving cell to the UE, where the configuration information of the EPDCCH is information used by the UE to learn, according to the configuration information of the EPDCCH, whether PRB bundling can be used in the non-serving cell.

Embodiment 4

Figure 9:
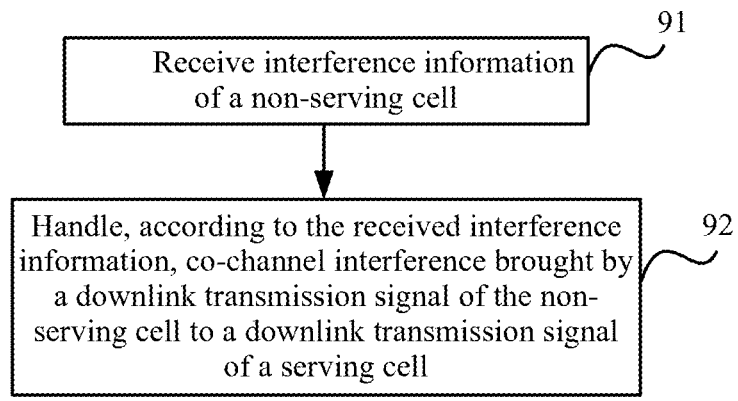
FIG. 9 is a flowchart of a method for handling co-channel cell interference on a UE side according to Embodiment 4.

Embodiment 4 proposes a method for handling co-channel cell interference. As shown in FIG. 9, a specific processing procedure of the method is as follows:

Step 91: Receive interference information of a non-serving cell.

Step 92: Handle, according to the received interference information, co-channel interference brought by a downlink transmission signal of the non-serving cell to a downlink transmission signal of a serving cell.

For the serving cell in which the UE is currently located, the interference information refers to all information that is used to demodulate a PDSCH and is sent by a network device that serves the non-serving cell to a UE in the cell that the network device serves. Details are described in Embodiment 4 by using an example in which the network device that sends the interference information to the UE is a network device that serves the serving cell in which the UE is currently located.

Because the interference information includes a relatively large amount of content, the network device may send a part or all of the interference information to the UE. The UE may perform channel estimation on a downlink transmission channel of the non-serving cell according to the received part or all of the interference information, and handle, according to an obtained channel estimation value, the co-channel interference brought by the downlink transmission signal of the non-serving cell to the downlink transmission signal of the serving cell.

The UE determines the user-terminal-specific reference signal sequence of the non-serving cell according to the received generation parameter, performs channel estimation on the downlink transmission channel of the non-serving cell according to the determined user-terminal-specific reference signal sequence, and handles, according to the obtained channel estimation value and the pilot data power ratio information of the non-serving cell, the co-channel interference brought by the downlink transmission signal of the non-serving cell to the downlink transmission signal of the serving cell.

Specifically, the UE may obtain a demodulation pilot sequence in a position of a currently scheduled time-frequency resource of the serving cell and based on the physical resource block bundling PRB bundling information, the information about the PRB in which the transmission mode based on the user-terminal-specific reference signal sequence demodulation channel is used in the non-serving cell, and the information about the antenna port used in the non-serving cell to send the determined user-terminal-specific reference signal sequence, where the demodulation pilot sequence is on the antenna port corresponding to the antenna port information and is used to demodulate a reference signal transmitted over the downlink transmission channel; and perform channel estimation on the downlink transmission channel of the non-serving cell according to the obtained demodulation pilot sequence and based on the PRB bundling information.

Correspondingly, according to the received interference information, the PRB bundling information may be bundling of a preset fixed quantity of PRBs; or the PRB bundling information is obtained from the received interference information.

Correspondingly, according to the received interference information, the information about the PRB in which the transmission mode based on the user-terminal-specific reference signal sequence demodulation channel is used in the non-serving cell is obtained from the received interference information; or the information about the PRB in which the transmission mode based on the user-terminal-specific reference signal sequence demodulation channel is used in the non-serving cell is obtained by performing blind detection on a physical resource block PRB of the non-serving cell based on the PRB bundling information.

Correspondingly, according to the received interference information, the information about the antenna port used in the non-serving cell to send the user-terminal-specific reference signal sequence is obtained from the received interference information; or the information about the antenna port used in the non-serving cell to send the user-terminal-specific reference signal sequence is obtained by performing blind detection on a PRB of the non-serving cell based on the PRB bundling information.

Correspondingly, according to the received interference information, the pilot data power ratio information of the non-serving cell is obtained from the received interference information; or the pilot data power ratio information of the non-serving cell is a preset fixed value.

Specifically, after the part or all of the interference information sent by the network device is received, for a specific implementation manner of handling the co-channel interference according to the received interference information, refer to the detailed descriptions in the first manner to the fifth manner in the foregoing Embodiment 1, which is not described again in Embodiment 4.

Figure 10:
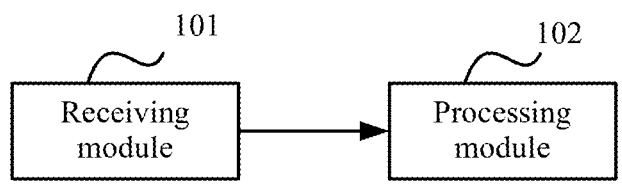
FIG. 10 is a schematic structural diagram of an apparatus for handling co-channel cell interference on a UE side according to Embodiment 4.

Correspondingly, Embodiment 4 further proposes an apparatus for handling co-channel cell interference. As shown in FIG. 10, a specific structure of the apparatus is as follows:

A receiving module 101 is configured to: receive interference information of a non-serving cell, and transmit the received interference information to a processing module 102, where the interference information includes a generation parameter, and the generation parameter is a parameter value used to determine an initialization parameter of a user-terminal-specific reference signal sequence of the non-serving cell.

The processing module 102 is configured to handle, according to the received interference information transmitted by the receiving module 101, co-channel interference brought by a downlink transmission signal of the non-serving cell to a downlink transmission signal of a serving cell.

Specifically, the foregoing processing module 102 is specifically configured to: determine the user-terminal-specific reference signal sequence of the non-serving cell according to the received generation parameter, perform channel estimation on a downlink transmission channel of the non-serving cell according to the determined user-terminal-specific reference signal sequence, and handle, according to an obtained channel estimation value and pilot data power ratio information of the non-serving cell, the co-channel interference brought by the downlink transmission signal of the non-serving cell to the downlink transmission signal of the serving cell.

Specifically, the foregoing processing module 102 is specifically configured to: obtain a demodulation pilot sequence in a position of a currently scheduled time-frequency resource of the serving cell and based on physical resource block bundling PRB bundling information, information about a PRB in which a transmission mode based on a user-terminal-specific reference signal sequence demodulation channel is used in the non-serving cell, and information about an antenna port used in the non-serving cell to send the determined user-terminal-specific reference signal sequence, where the demodulation pilot sequence is on the antenna port corresponding to the antenna port information and is used to demodulate a reference signal transmitted over the downlink transmission channel; and perform channel estimation on the downlink transmission channel of the non-serving cell according to the obtained demodulation pilot sequence and based on the PRB bundling information.

Specifically, the PRB bundling information obtained by the foregoing processing module 102 is bundling of a preset fixed quantity of PRBs; or the PRB bundling information is obtained from the received interference information.

Specifically, the information, obtained by the foregoing processing module 102, about the PRB in which the transmission mode based on the user-terminal-specific reference signal sequence demodulation channel is used in the non-serving cell is obtained from the received interference information; or the information about the PRB in which the transmission mode based on the user-terminal-specific reference signal sequence demodulation channel is used in the non-serving cell is obtained by performing blind detection on a physical resource block PRB of the non-serving cell based on the PRB bundling information.

Specifically, the information, obtained by the foregoing processing module 102, about the antenna port used in the non-serving cell to send the user-terminal-specific reference signal sequence is obtained from the received interference information; or the information about the antenna port used in the non-serving cell to send the user-terminal-specific reference signal sequence is obtained by performing blind detection on a PRB of the non-serving cell based on the PRB bundling information.

Specifically, the PRB bundling information of the non-serving cell obtained by the foregoing processing module 102 includes at least one of the following: information about whether PRB bundling can be used in the non-serving cell; information that PRB bundling can be used on a specific time domain resource of the non-serving cell within a set time period; and information that PRB bundling can be used on a time-frequency resource of the non-serving cell.

Specifically, the PRB bundling information of the non-serving cell obtained by the foregoing processing module 102 is obtained according to configuration information of an enhanced physical downlink control channel EPDCCH of the non-serving cell.

Specifically, the pilot data power ratio information of the non-serving cell obtained by the foregoing processing module 102 is obtained from the received interference information; or the pilot data power ratio information of the non-serving cell is a preset fixed value.

Figure 11:
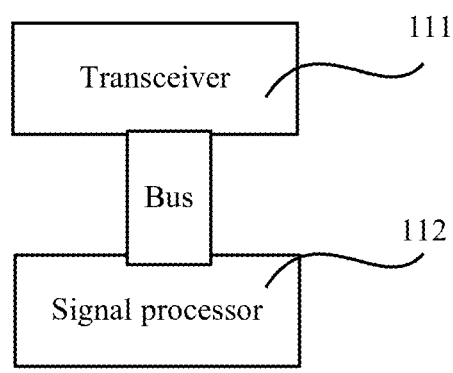
FIG. 11 is a schematic structural diagram of a user terminal according to Embodiment 4.

Correspondingly, Embodiment 4 further proposes a user terminal. As shown in FIG. 11, a specific structure of the user terminal includes a transceiver 111 and a signal processor 112. The transceiver 111 and the signal processor are connected by using a bus to transmit data.

The transceiver 111 is configured to: receive interference information of a non-serving cell, and transmit the received interference information to the signal processor 112, where the interference information includes a generation parameter, and the generation parameter is a parameter value used to determine an initialization parameter of a user-terminal-specific reference signal sequence of the non-serving cell.

The signal processor 112 is configured to handle, according to the received interference information transmitted by the transceiver 111, co-channel interference brought by a downlink transmission signal of the non-serving cell to a downlink transmission signal of a serving cell.

Specifically, the foregoing signal processor 112 is specifically configured to: determine the user-terminal-specific reference signal sequence of the non-serving cell according to the received generation parameter, perform channel estimation on a downlink transmission channel of the non-serving cell according to the determined user-terminal-specific reference signal sequence, and handle, according to an obtained channel estimation value and pilot data power ratio information of the non-serving cell, the co-channel interference brought by the downlink transmission signal of the non-serving cell to the downlink transmission signal of the serving cell.

Specifically, the foregoing signal processor 112 is specifically configured to: obtain a demodulation pilot sequence in a position of a currently scheduled time-frequency resource of the serving cell and based on physical resource block bundling PRB bundling information, information about a PRB in which a transmission mode based on a user-terminal-specific reference signal sequence demodulation channel is used in the non-serving cell, and information about an antenna port used in the non-serving cell to send the determined user-terminal-specific reference signal sequence, where the demodulation pilot sequence is on the antenna port corresponding to the antenna port information and is used to demodulate a reference signal transmitted over the downlink transmission channel; and perform channel estimation on the downlink transmission channel of the non-serving cell according to the obtained demodulation pilot sequence and based on the PRB bundling information.

Specifically, the PRB bundling information obtained by the foregoing signal processor 112 is bundling of a preset fixed quantity of PRBs; or the PRB bundling information is obtained from the received interference information.

Specifically, the information, obtained by the foregoing signal processor 112, about the PRB in which the transmission mode based on the user-terminal-specific reference signal sequence demodulation channel is used in the non-serving cell is obtained from the received interference information; or the information about the PRB in which the transmission mode based on the user-terminal-specific reference signal sequence demodulation channel is used in the non-serving cell is obtained by performing blind detection on a physical resource block PRB of the non-serving cell based on the PRB bundling information.

Specifically, the information, obtained by the foregoing signal processor 112, about the antenna port used in the non-serving cell to send the user-terminal-specific reference signal sequence is obtained from the received interference information; or the information about the antenna port used in the non-serving cell to send the user-terminal-specific reference signal sequence is obtained by performing blind detection on a PRB of the non-serving cell based on the PRB bundling information.

Specifically, the PRB bundling information of the non-serving cell obtained by the foregoing signal processor 112 includes at least one of the following: information about whether PRB bundling can be used in the non-serving cell; information that PRB bundling can be used on a specific time domain resource of the non-serving cell within a set time period; and information that PRB bundling can be used on a time-frequency resource of the non-serving cell.

Specifically, the PRB bundling information of the non-serving cell obtained by the foregoing signal processor 112 is obtained according to configuration information of an enhanced physical downlink control channel EPDCCH of the non-serving cell.

Specifically, the pilot data power ratio information of the non-serving cell obtained by the foregoing signal processor 112 is obtained from the received interference information; or the pilot data power ratio information of the non-serving cell is a preset fixed value.

A person skilled in the art should understand that the embodiments may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
receiving, by a user terminal, interference information of a non-serving cell, wherein the interference information comprises a generation parameter, physical resource block (PRB) bundling information of the non-serving cell, and pilot data power ratio information of the non-serving cell, and wherein the generation parameter is a physical cell identifier of the non-serving cell, the pilot data power ratio information of the non-serving cell comprises a public parameter (PB) of the non-serving cell and a number of antenna ports of cell-specific reference signals (CRSs) of the non-serving cell, and wherein the user terminal assumes, according to the PRB bundling information, PRBs that are applied with the same precoding; and suppressing, by the user terminal according to the received interference information, co-channel interference brought by a downlink transmission signal of the non-serving cell to a downlink transmission signal of a serving cell, wherein suppressing, by the user terminal, the co-channel interference brought by the downlink transmission signal of the non-serving cell to the downlink transmission signal of the serving cell comprises:
  determining a user-terminal-specific reference signal sequence of the non-serving cell according to the received generation parameter;
  performing channel estimation on a downlink transmission channel of the non-serving cell according to the determined user-terminal-specific reference signal sequence, wherein performing the channel estimation on the downlink transmission channel of the non-serving cell according to the determined user-terminal-specific reference signal sequence comprises:
    obtaining a demodulation pilot sequence in a position of a currently scheduled time-frequency resource of the serving cell, wherein the demodulation pilot sequence is obtained based on the PRB bundling information, information about a PRB in which a transmission mode based on the user-terminal-specific reference signal sequence demodulation channel is used in the non-serving cell, and information about a first antenna port used in the non-serving cell to send the user-terminal-specific reference signal sequence, and wherein the demodulation pilot sequence is on the first antenna port and is used to demodulate a reference signal transmitted over the downlink transmission channel of the non-serving cell; and
    performing channel estimation on the downlink transmission channel of the non-serving cell according to the obtained demodulation pilot sequence and based on the PRB bundling information; and
  suppressing, according to an obtained channel estimation value and the pilot data power ratio information of the non-serving cell, the co-channel interference brought by the downlink transmission signal of the non-serving cell to the downlink transmission signal of the serving cell.

2. An apparatus, comprising:
one or more processors;
a non-transitory memory for storing computer instructions that, when executed by the one or more processors, are configured to cause the apparatus to:
  receive interference information of a non-serving cell, wherein the interference information comprises a generation parameter, physical resource block (PRB) bundling information of the non-serving cell, and pilot data power ratio information of the non-serving cell, wherein the generation parameter is a physical cell identifier of the non-serving cell, and the pilot data power ratio information of the non-serving cell comprises a public parameter (PB) of the non-serving cell and a number of antenna ports of cell-specific reference signals (CRSs) of the non-serving cell, and wherein the apparatus is configured to assume, according to the PRB bundling information, PRBs that are applied with the same precoding; and
  suppress, according to the received interference information, co-channel interference brought by a downlink transmission signal of the non-serving cell to a downlink transmission signal of a serving cell, wherein suppressing, according to the received interference information, the co-channel interference comprises:
    determining a user-terminal-specific reference signal sequence of the non-serving cell according to the received generation parameter;
    performing channel estimation on a downlink transmission channel of the non-serving cell according to the user-terminal-specific reference signal sequence, wherein performing channel estimation on the downlink transmission channel of the non-serving cell according to the user-terminal-specific reference signal sequence comprises:
      obtaining a demodulation pilot sequence in a position of a currently scheduled time-frequency resource of the serving cell, wherein the demodulation pilot sequence is obtained based on the PRB bundling information, information about a PRB in which a transmission mode based on the user-terminal-specific reference signal sequence demodulation channel is used in the non-serving cell, and information about a first antenna port used in the non-serving cell to send the user-terminal-specific reference signal sequence, wherein the demodulation pilot sequence is on the first antenna port, and the demodulation pilot sequence is used to demodulate a reference signal transmitted over the downlink transmission channel; and
      performing channel estimation on the downlink transmission channel of the non-serving cell according to the obtained demodulation pilot sequence and based on the PRB bundling information; and
    suppressing, according to an obtained channel estimation value, the co-channel interference brought by the downlink transmission signal of the non-serving cell to the downlink transmission signal of the serving cell.

* * * * *